United States Patent
Buendgen et al.

(10) Patent No.: US 9,894,051 B2
(45) Date of Patent: Feb. 13, 2018

(54) EXTENDING SHROUDING CAPABILITY OF HOSTING SYSTEM

(71) Applicant: INTERNATIONAL BUSINESS MACHINES CORPORATION, Armonk, NY (US)

(72) Inventors: Reinhard T. Buendgen, Tuebingen (DE); Jeffrey A. Frey, New Paltz, NY (US); Jeb R. Linton, Manassas, VA (US); James A. O'Connor, Ulster Park, NY (US); William J. Rooney, Hopewell Junction, NY (US); George C. Wilson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 14/968,122

(22) Filed: Dec. 14, 2015

(65) Prior Publication Data
US 2017/0171179 A1    Jun. 15, 2017

(51) Int. Cl.
*H04L 29/06* (2006.01)
*G06F 9/455* (2006.01)
(Continued)

(52) U.S. Cl.
CPC .......... *H04L 63/08* (2013.01); *G06F 9/45558* (2013.01); *H04L 9/14* (2013.01);
(Continued)

(58) Field of Classification Search
CPC ....... H04L 63/08; H04L 63/061; H04L 63/10; G06F 8/63; G06F 9/45558
See application file for complete search history.

(56) References Cited

U.S. PATENT DOCUMENTS

| 8,156,298 | B1 | 4/2012 | Stubblefield | |
| 2005/0198303 | A1* | 9/2005 | Knauerhase | G06F 9/5055 709/227 |

(Continued)

OTHER PUBLICATIONS

Razavi et al., Scalable virtual machine deployment using VM image caches, Nov. 2013, Proceedings of the International Conference on High Performance Computing, Networking, Storage and Analysis, pp. 1-12.*

(Continued)

*Primary Examiner* — Kenneth Chang
(74) *Attorney, Agent, or Firm* — Cantor Colburn LLP; William A. Kinnaman, Jr.

(57) ABSTRACT

Technical solutions are described for extending shrouding capability of a virtual server hosting system. An example method includes receiving a request to deploy a shrouded virtual server using a predetermined set of hardware components, and using a shrouded mode. The method also includes adding a guest server to the hosting system, the guest server including the predetermined set of hardware components. The method also includes deploying a preconfigured hypervisor on the guest server, where the preconfigured hypervisor is deployed in an immutable mode that disables changes to security settings of the preconfigured hypervisor. The method also includes deploying, by the preconfigured hypervisor, a preconfigured boot image as an instance of the virtual server on the preconfigured hypervisor. The method also includes sending an identifier of the virtual server for receipt by the client device.

15 Claims, 12 Drawing Sheets

(51) Int. Cl.
*H04L 9/14* (2006.01)
*H04L 9/30* (2006.01)
*H04L 9/32* (2006.01)

(52) U.S. Cl.
CPC .............. *H04L 9/30* (2013.01); *H04L 9/3263* (2013.01); *H04L 63/06* (2013.01); *H04L 63/061* (2013.01); *H04L 63/0823* (2013.01); *H04L 63/10* (2013.01); *G06F 2009/4557* (2013.01); *G06F 2009/45562* (2013.01); *G06F 2009/45595* (2013.01)

(56) References Cited

U.S. PATENT DOCUMENTS

| | | | | |
|---|---|---|---|---|
| 2008/0148064 A1* | 6/2008 | Challener | ............... | G06F 21/57 713/189 |
| 2009/0112972 A1* | 4/2009 | Liu | ................... | G06F 9/45537 709/203 |
| 2011/0302400 A1 | 12/2011 | Maino et al. | | |
| 2012/0266169 A1* | 10/2012 | Lagergren | ............. | G06F 9/4401 718/1 |
| 2012/0266231 A1 | 10/2012 | Spiers et al. | | |
| 2013/0263120 A1* | 10/2013 | Patil | ................... | G06F 9/45558 718/1 |
| 2013/0318595 A1* | 11/2013 | Wang | ................. | G06F 9/45558 726/16 |
| 2014/0053150 A1* | 2/2014 | Barnett | ................... | G06F 9/455 718/1 |

OTHER PUBLICATIONS

List of IBM Patents or Patent Applications Treated as Related; (Appendix P), Filed Jun. 15, 2017; 2 pages.

Reinhard T. Buendgen et al. "Extending Shrouding Capability of Hosting System", U.S. Appl. No. 15/175,247, filed Jun. 7, 2016.

* cited by examiner

EXTENDING SHROUDING CAPABILITY OF HOSTING SYSTEM

BACKGROUND

The present application relates to computer technology, and more specifically, to virtual servers.

Cloud computing facilitates a client to provision a virtual server quickly and easily, without requiring the client to purchase hardware or provide floor space for a physical server. The client may expand or contract the virtual server according to changing preference(s). For example, the client requests a cloud-computing provider to provision the virtual server, which is physically resident at the provider's datacenter.

With events such as revelations on government agencies, such as National Security Agency (NSA) of the U.S., spying on data, documents being released by data administrators, clients are wary of security of data in the virtual server. For example, a client may request that cloud providers physically host their computing services within the country of the client, so as to reduce or avoid the possibility that the cloud computing provider, such as a U.S. company is forced, possibly through subpoena, to turn over confidential or proprietary documents of the non-U.S. client to a U.S. government agency.

To comply with such requests, the cloud computing provider, would have to deploy datacenters in each country it does business in, or in each country that implements a different data protection policy, which would be a costly endeavor. In addition, the client, such as a large corporation, may maintain copies of data at remote datacenters for disaster recovery. The distance at which the remote datacenter is physically located from the local datacenter is limited based on the geographic size of the country of the client, or the country hosting datacenters of the cloud-computing provider. Considering that a client may prefer to literally have the remote datacenter on a different continent for maximum protection, a small country such as Monaco would not be able to place a remote datacenter far enough away to be protected from a regional disaster that could impact both the primary and disaster recovery sites.

SUMMARY

According to an embodiment, a computer implemented method for extending shrouding capability of a virtual server hosting system includes receiving, by a host manager, a request to deploy a shrouded virtual server using a predetermined set of hardware components, and using a shrouded mode, the shrouded mode preventing an administrator of a hosting system from accessing data or applications of the virtual server, the request being sent by a client device. The computer implemented method also includes adding, by the host manager, a guest server to the hosting system, the guest server including the predetermined set of hardware components. The computer implemented method also includes deploying, by the host manager, a preconfigured hypervisor on the guest server, where the preconfigured hypervisor is deployed in an immutable mode that disables changes to security settings of the preconfigured hypervisor. The computer implemented method also includes deploying, by the preconfigured hypervisor, a preconfigured boot image as an instance of the virtual server on the preconfigured hypervisor. The computer implemented method also includes sending, by the host manager, an identifier of the virtual server for receipt by the client device.

According to another embodiment, a system for extending shrouding capability of a virtual server hosting system, includes a server computer and a host manager console. The host manager console receives a request to deploy a shrouded virtual server using a predetermined set of hardware components, and using a shrouded mode, the shrouded mode preventing an administrator of a hosting system from accessing data or applications of the virtual server, the request being sent by a client device. The host manager console also adds a guest server to the hosting system, the guest server including the predetermined set of hardware components. The host manager console also deploys a preconfigured hypervisor on the guest server, where the preconfigured hypervisor is deployed in an immutable mode that disables changes to security settings of the preconfigured hypervisor. The host manager console also deploys, via the preconfigured hypervisor, a preconfigured boot image as an instance of the virtual server on the preconfigured hypervisor. The host manager console also sends an identifier of the virtual server for receipt by the client device.

According to another embodiment, a computer program product for extending shrouding capability of a virtual server hosting system includes a computer readable storage medium. The computer readable storage medium includes computer executable instructions to receive a request to deploy a shrouded virtual server using a predetermined set of hardware components, and using a shrouded mode, the shrouded mode preventing an administrator of a hosting system from accessing data or applications of the virtual server, the request being sent by a client device. The computer readable storage medium also includes computer executable instructions to add a guest server to the hosting system, the guest server including the predetermined set of hardware components. The computer readable storage medium also includes computer executable instructions to deploy a preconfigured hypervisor on the guest server, where the preconfigured hypervisor is deployed in an immutable mode that disables changes to security settings of the preconfigured hypervisor. The computer readable storage medium also includes computer executable instructions to deploy, via the preconfigured hypervisor, a preconfigured boot image as an instance of the virtual server on the preconfigured hypervisor. The computer readable storage medium also includes computer executable instructions to send an identifier of the virtual server for receipt by the client device.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Authenticating Features of a Virtual Server Hosting System

Disclosed here are technical solutions for authenticating features of a hosting system that hosts a virtual server that a client requested. For example, the technical solutions authenticate to the client that the virtual server has been deployed on a platform that provides characteristics, or features, or services that the client is paying for. For example, a specific platform type (such as z System, Power, Intel, or any other) or other value add features that provide, security, performance or other features that the client has contracted to pay for is authenticated. The technical solutions thus facilitate the client to host the virtual server that may include valuable assets in a public cloud, assured that the virtual server meets the demands according to the client's preferences, and not just solely based on the word of the cloud provider. For example, the client may demand that the cloud provider, such as administrators or other employees of the cloud provider, do not have access to the virtual server, programs running on the server, or the data that the virtual server contains. Alternatively or in addition, the technical solutions further facilitate the client to deploy a boot image on the cloud provider server in a way that assures the client that the cloud provider cannot tamper with it, and allow the client to boot from the boot image.

Figure 1:
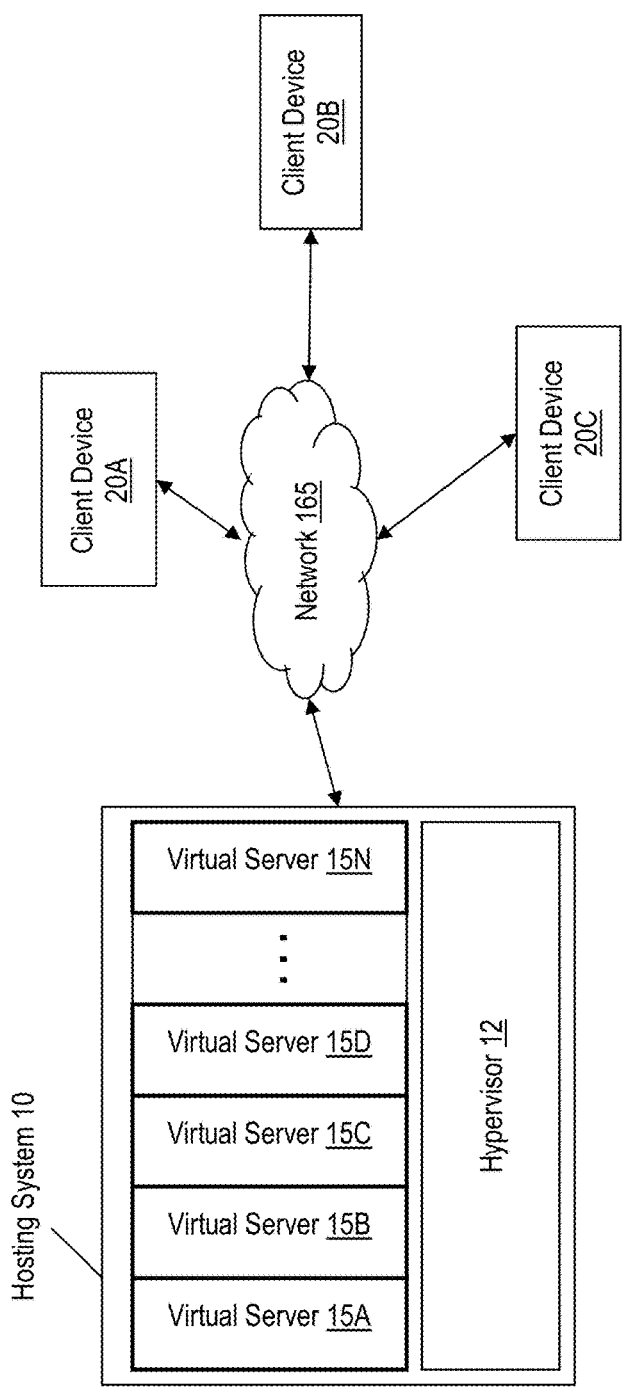
FIG. 1 illustrates an example system for hosting system, in accordance with an embodiment.

FIG. 1 illustrates an example hosting system 10. The hosting system 10 is in communication with one or more client devices 20A-20C via a network 165. The hosting system 10 is a datacenter of a cloud-computing provider. The hosting system 10 executes a hypervisor 12, which facilitates deploying one or more virtual servers 15A-15N. For example, the hosting system 10 facilitates a client device 20A to deploy one or more of the virtual servers 15A-15N. The virtual servers 15A-15N may be deployed in response to respective requests from distinct clients 20A-20C. For example, the virtual server 15A may be deployed by the client device 20A, the virtual server 15B may be deployed by the client device 20B, and the virtual server 15C may be deployed by the client device 20C. The hosting system 10 may provide several features to the client(s), such as facilitating a client to provision a virtual server and sharing the virtual server with another virtual machine, which may be provisioned by the same or a different client. The hosting system 10 may also facilitate a client to provision a physical server (without running as a virtual machine). The examples described herein embody the provisioning of resources in the hosting system 10 as part of a 'virtual server,' however, the technical solutions described can be applied to provision the resources as part of a physical server.

In an example, the client devices 20A-20C may belong to the same entity, such as a person, a business, a government agency, a department within a company, or any other entity, and the hosting system 10 may be operated as a private cloud of the entity. In this case, the hosting system 10 solely hosts virtual servers 15A-15N that are deployed by the client devices 20A-20C that belong to the entity. In another example, the client devices 20A-20C may belong to distinct entities. For example, a first entity may own the client device 20A, while a second entity may own the client device 20B. In this case, the hosting system 10 may be operated as a public cloud that hosts virtual servers from different entities. For example, the virtual servers 15A-15N may be deployed in a shrouded manner in which the virtual server 15A does not facilitate access to the virtual server 15B. For example, the hosting system 10 may shroud the virtual servers 15A-15N using an IBM z System Processor Resource/Systems Manager (PR/SM™) Logical Partition (LPAR) feature. The features, such as the PR/SM LPAR provides isolation between partitions, thus facilitating the hosting system 10 to deploy two or more virtual servers 15A-15N for different entities on the same physical hosting system 10 in different logical partitions.

A client device 20A from the client devices 20A-20C is a communication apparatus such as a computer, a smartphone, a tablet computer, a desktop computer, a laptop computer, a server computer, or any other communication apparatus that requests deployment of a virtual server by the hypervisor 12 of the hosting system 10. The client device 20A may send a request for receipt by the hypervisor via the network 165. A virtual server 15A, from the virtual servers 15A-15N is a virtual machine image that the hypervisor 12 deploys in response to a request from the client device 20A from the client devices 20A-20C. The hypervisor 12 is a virtual machine monitor (VMM), which may be software, firmware, or hardware that creates and runs virtual machines. The hypervisor 12 facilitates the virtual server 15A to use the hardware components of the hosting system 10 to execute programs and/or store data. With the appropriate features and modifications the hypervisor 12 may be IBM Z SYSTEM™, ORACLE VM SERVER™, CITRIX XEN-SERVER™, VMWARE ESX™, MICROSOFT HYPER-V™, or any other hypervisor. The hypervisor 12 may be a native hypervisor executing on the hosting system 10 directly, or a hosted hypervisor executing on another hypervisor.

Figure 2:
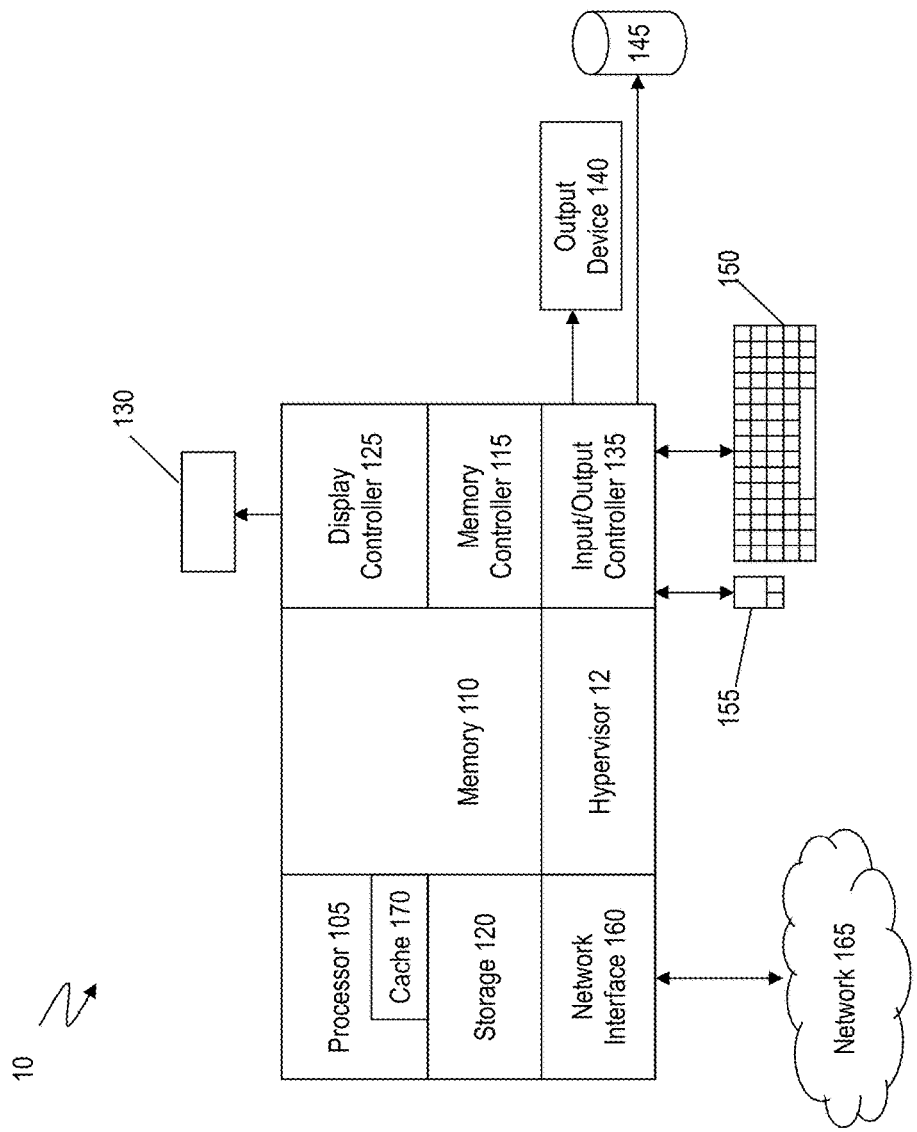
FIG. 2 illustrates an example block diagram of a hosting system, in accordance with an embodiment.

FIG. 2 illustrates components of an example hosting system 10. The hosting system 10 may be a computer, such as a server computer, a desktop computer, a tablet computer, a smartphone, or any other computer that executes the hypervisor 12, which in turn deploys the virtual servers 15A-15N. The hosting system 10 includes components that include hardware, such as electronic circuitry. The hosting system 10 includes, among other components, a processor 105, memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the hosting system 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, flash memory, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS), which executes the hypervisor 12. The operating system may control the execution of other computer programs and provides scheduling, input-output control, file and data management, memory management, and communication control and related services. In an example, such as the z System™, a manufacturer of the hosting system 10 may provide the hypervisor 12. In the case of a system with a structure unlike that of z System, where the hypervisor 12 is not provided by the hardware manufacturer, the cloud computing provided may use a hypervisor 12 such as from VMWARE™, or other hypervisor providers. In an example, the hypervisor 12 an administrator of the physical hosting system 10 is unable to modify the hypervisor 12, except when needed in order to apply service provided by the manufacturer. For example, the hypervisor 12 may be provided as part of a "Licensed Internal Code (LIC)" and/or microcode for the hosting system 10.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The hosting system 10 may further include a display controller 125 coupled to a user interface or display 130. In some embodiments, the display 130 may be an LCD screen. In other embodiments, the display 130 may include a plurality of LED status lights. In some embodiments, the hosting system 10 may further include a network interface 160 for coupling to a network 165. The network 165 may be an IP-based network for communication between the hosting system 10 and an external server, client and the like via a broadband connection. In an embodiment, the network 165 may be a satellite network. The network 165 transmits and receives data between the hosting system 10 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

The client device 20A may request the hypervisor 12 to deploy the corresponding virtual server 15A with access to specific hardware and/or software components of the hosting system 10. For example, the client 20A may request that the virtual server 15A have access to a predetermined number of processors, a predetermined amount of volatile memory (such as random access memory (RAM)), a predetermined amount of non-volatile memory (such as storage space), or any other hardware components. Alternatively or in addition, the client device 20A may request that the virtual server 15A have access to specific hardware components such as electronic circuitry identified by corresponding unique identifier. For example, the client device 20A may request that the virtual server 15A have access to a specific type of a processor, a co-processor, a network card, or any other chip or electronic circuitry. In an example, the client device 20A may identify the electronic circuitry using an identifier provided by a manufacturer of the electronic circuitry. In an example, the identifier may be used in conjunction with a version identifier. Alternatively or in addition, the client device 20A may request that the virtual server 15A have access to specific software components such as an operating system, an application, a BIOS, a boot image, or any other software component. The software components requested may include firmware and embedded programs in the hardware components of the hosting system 10. The client device 20A may identify the software components requested using respective unique identifiers provided by developers/manufacturers of the respective software components. In an example, the identifiers may be used in conjunction with version identifiers of the software components.

In an example, the client device 20A (or the entity corresponding to the client device 20A) may be charged a fee specific to the hardware/software component that the client device 20A requests for the virtual server 15A. For example, the client device 20A may be charged a fee of X USD for deploying the virtual server 15A on the hosting system 10 equipped with sixteen processors, 64 gigabytes (GB) of RAM, and a massively parallel computing device. In another example, the client device 20A may be charged a fee of Y USD for deploying the virtual server 15A on the hosting system 10 that is equipped with four processors, and 8 GB of RAM. Thus, the client device 20A may select and request a set of hardware specifications for deploying the virtual server. In addition or alternatively, the client device 20A may be charged P USD for deploying the virtual server 15A on the hosting system 10 that uses a first operating system, such as MICROSOFT WINDOWS™, while Q USD for a second operating system, such as LINUX™. Alternatively or in addition, the fee may vary based on whether the hosting system 10 facilitates access to specific software component, such as a boot image, a BIOS, an encryption program, a word processing software, a spreadsheet software, or any other type of software component.

Thus, the client device 20A may prefer to verify that the particular hardware/software components being charged for are being provided by the hosting system 10. For example, consider that the hosting system 10 is operated as a public cloud and that the client device 20A is requesting deployment of the virtual server 15A by the cloud provider that operates the hosting system 10 for the very first time, that is there is no existing business relationship in this regard between the entity corresponding to the client device 20A and the cloud provider that operates the hosting system 10. Of course, other examples are possible where the client device 20A prefers to verify the resources being made available to the virtual server 15A, such as to confirm operational efficiency/performance of the virtual server 15A, auditing purposes, or any other such purpose.

The technical solutions described herein facilitate the client device 20A to confirm that the virtual server 15A is being deployed or is already deployed at the hosting system 10, which is a physical server which has the desired features. In an example, an authority, such as a computer manufacturer of the hosting system 10, or another third-party verification system authenticates, or confirms the features, without the authentication being spoofed.

Figure 3:
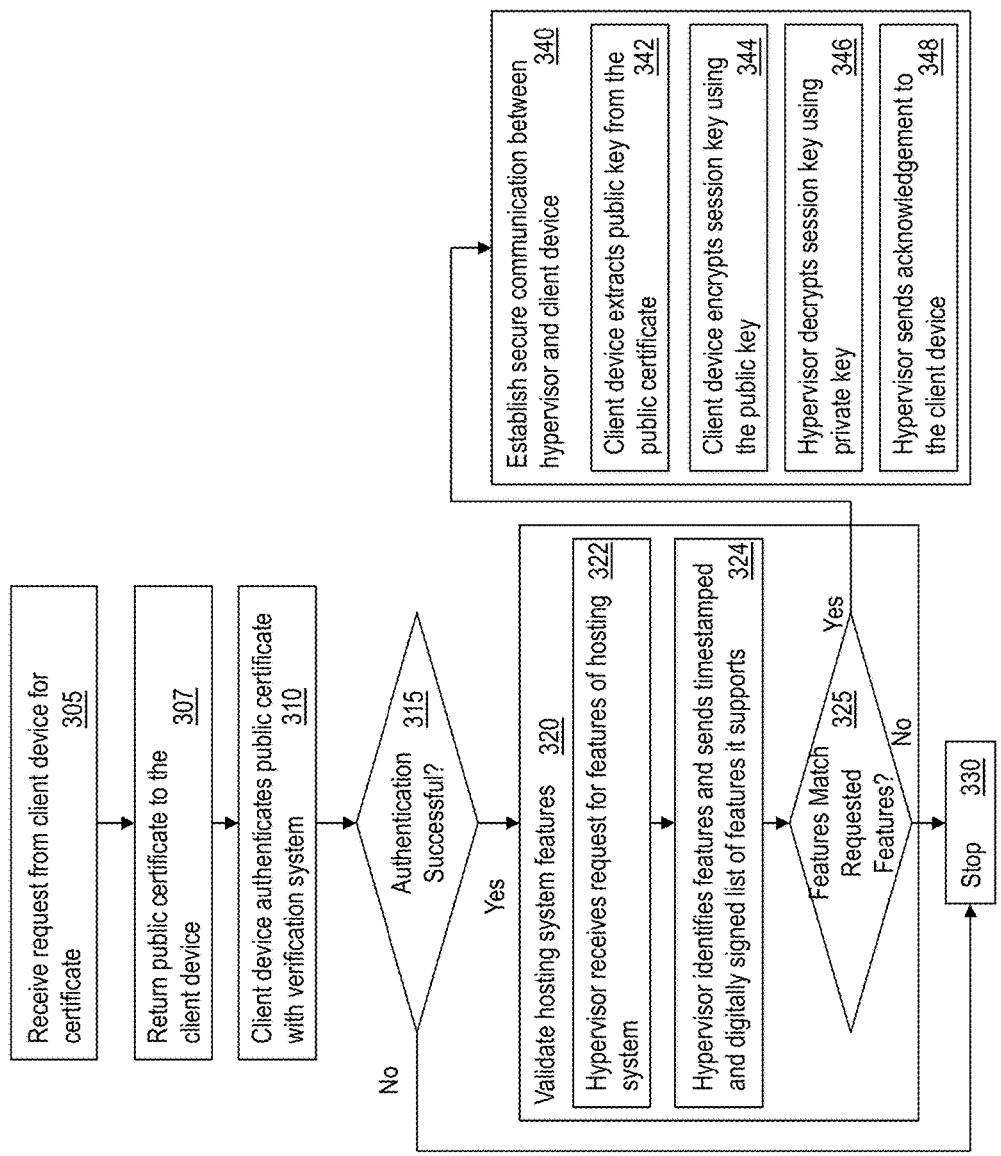
FIG. 3 illustrates a flowchart of example logic to validate or authenticate features of a hosting system in accordance with an embodiment.

FIG. 3 illustrates a flowchart of an embodiment of a method of authenticating the features of the hosting system 10. The method may be implemented by the hosting system 10 in conjunction with the client device 20A. The client device 20A communicates with the hypervisor 12 hosting the virtual server 15A, over network 160. The client device 20A requests a certificate from the hypervisor 12, as shown at block 305. The hypervisor 12 responds to the request by sending a public certificate associated with the hosting system 10 to the client device 20A, as shown at block 307.

Figure 4:
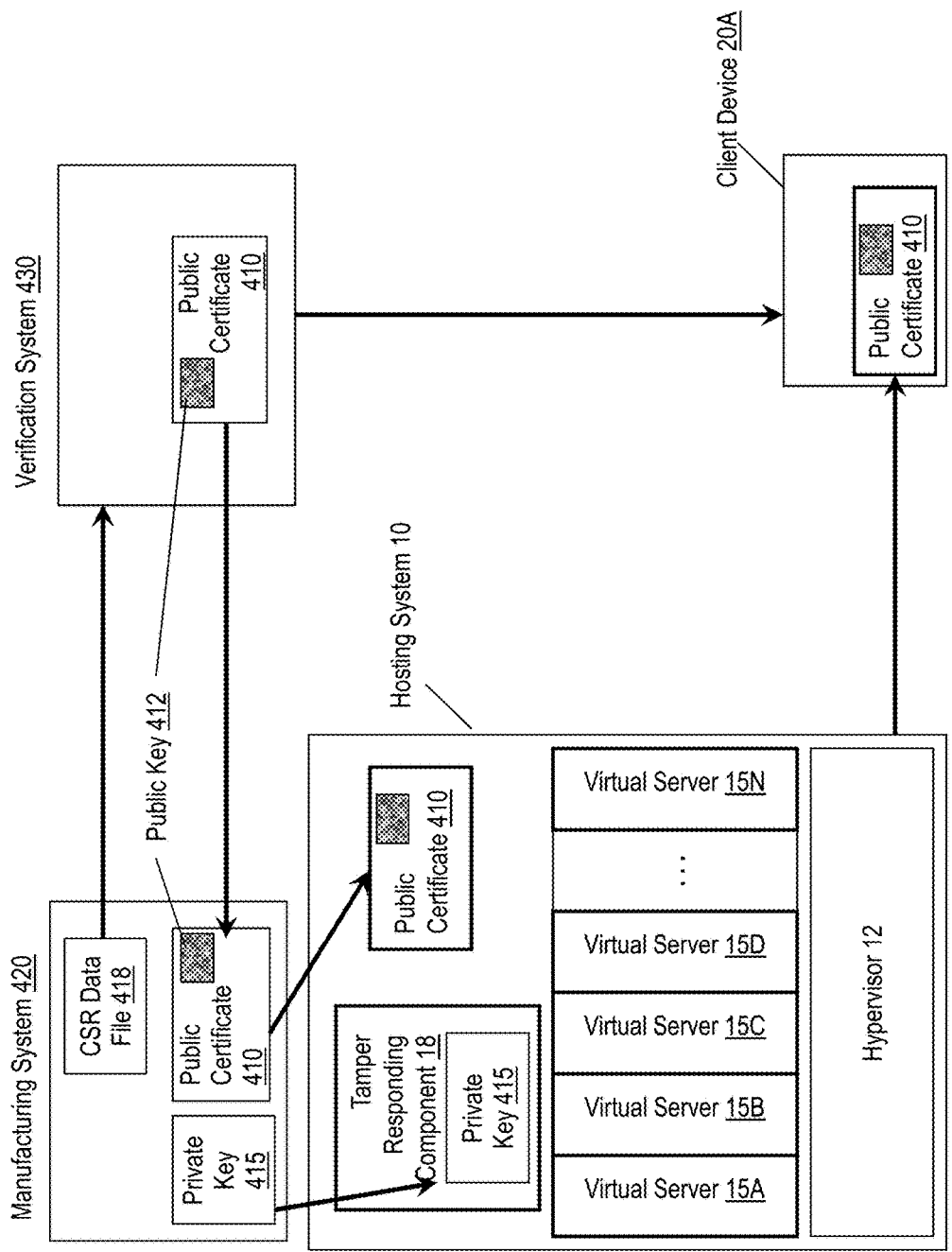
FIG. 4 illustrates an example data flow of a public certificate and a private key, in accordance with an embodiment.
Figure 5:
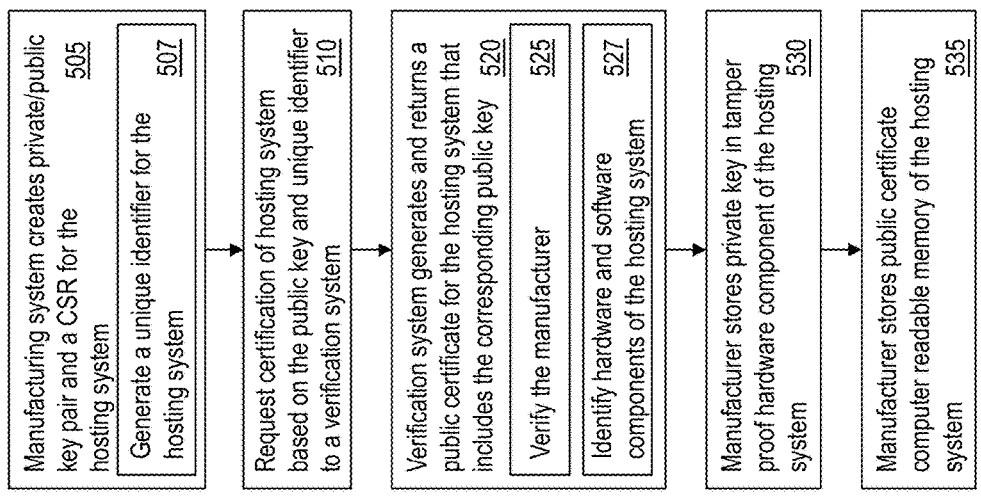
FIG. 5 illustrates a flowchart of example logic to pre-install a public certificate and a private key in a hosting system, in accordance with an embodiment.

FIG. 4 illustrates an example in which the hosting system 10 includes a public certificate 410 provided by the manufacturing system 420 of the hosting system 10. As illustrated, the manufacturing system 420 may communicate with a verification system 430, which in turn may be accessed by the client device 20A. FIG. 5 illustrates creation and storage of a public certificate 410. The manufacturing system 420 may be a server, or any other type of computer, that is controlled by a manufacturer of the hosting system 10, such as IBM™, MICROSOFT™, HP™ or any other manufacturer. The verification system 430 may be a server, or any other type of computer, controlled by a third-party independent of the manufacturer of the hosting system, such as VERISIGN, SYMANTEC, or any other third-party that clients of the cloud computing provider trust. In an example, the verification system 430 may be controlled by the manufacturer 420.

Referring to FIGS. 4 and 5, the manufacturing system 420 creates a combination of a public key 412 and a private key 415 for the hosting system 10, as shown at block 505. The manufacturing system 420, in addition or alternatively, generates a certification-signing request (CSR) data file 418, as shown at block 505. The manufacturing system 420, in addition or alternatively, generates a unique identification for the hosting system 10, such as based on a serial number, the manufacturer name or brand, a plant of manufacture, a model number, or any other identifier or a combination thereof, as shown at block 507. The manufacturing system 420 sends the certification request 418 to the verification system 430, as shown at block 510. In addition to or as part of a certification request, the manufacturing system 420 sends, to the verification system 430, the CSR data file 418, which contains the public key 412 and the unique identifier of the hosting system 10. The verification system 430, in response, generates the public certificate 410 corresponding to the hosting system 10, as shown at block 520. The verification system 430, during generating the public certificate 412 may verify that the certification request 418 and associated information is received from the manufacturing system 420, for example, based on an identifier associated with the manufacturing system 420, as shown at block 525. For example, the verification system 430 verifies an IP address, a MAC address, or other unique identification of the manufacturing system 420.

In an example, the verification system 430 identifies the hardware and software components that the manufacturing system 420 installs in the hosting system 10, as shown at block 527. For example, the verification system 430 requests the manufacturing system 420 for a specification of the hosting system 10. The specification may include a list of the hardware and software components of the hosting system 10. For example, the specification may identify each component in the hosting system by respective identification codes, such as serial numbers, version numbers, and other identifiers that may be provided by respective original equipment manufacturers (OEM). The specification may further include driver version identification of the components. The verification system 430, in an example, may determine details of the respective component in the hosting system 10 by accessing a system that includes detailed specification of the component, such as a website maintained by the OEM. The verification system 430 stores the information of the hosting system 10 mapped with the public certificate 410 and/or the unique identification of the hosting system 10. Accordingly, the verification system 430 facilitates identifying the components and specifications of the components of the hosting system 10.

The verification system 430 returns the public certificate 410 to the manufacturing system 420. The public certificate 410 includes the public key 412. The public certificate 418 may be a digitally signed certificate bearing a seal of verification by the verification system 430. The manufacturing system 420 stores the public certificate 410 into the hosting system 10, for example in a computer readable memory within the hosting system 10, such that the hypervisor 12 has access to the public certificate 410, as shown at block 535.

The manufacturing system 420 stores the private key 415 that corresponds to the public key 412, in a tamper proof hardware component 18 of the hosting system 10, as shown at block 530. The private key 415 may be stored at any time after the private key 415 has been generated. In another example, the manufacturing system 420 adds the private key 412 into a tamper proof hardware component 18 and subsequently adds the hardware component into the hosting system 10. For example, the tamper proof hardware component 18 may be a crypto card, that facilitates that the private key 415 cannot be accessed by the cloud provider without destroying the tamper proof hardware component 18 before the private key 415 can be read. For example, the private key 415 is stored in tamper proof hardware component and/or infrastructure firmware, such as the IBM™ PCIE CRYPTOGRAPHIC COPROCESSOR. The IBM™ PCIE CRYPTOGRAPHIC COPROCESSOR is certified by the National Institute of Standards and Technology (NIST) and validated at FIPS PUB 140-2 security level-4. Thus, the private key 415 is stored with a higher security than the public certificate 410. The private key 415 is stored in such a way that only the hypervisor 12 is able to extract the private key 415. There are no instructions provided such that either an operating system or application running in the virtual server 15A can extract the private key 415.

In FIG. 4, the dark arrows identify an example path of the public certificate 410 and the private key 415.

Further yet, for additional protection, the verification system may issue the public certificate that is valid between predetermined dates. For example, the public certificate may include a "not before" and "not after" date, so that a public certificate that is not being accessed between the predetermined dates is considered invalid. The manufacturing system 420 may, thus, periodically send the CSR 418 to the verification system 430 to obtain an updated public certificate and store the updated public certificate into the hosting system 10. Additionally, the manufacturing system 420, in response to an update of the hosting system 10, may update the verification system 430 and request the updated public certificate corresponding to the updated hosting system 10. For example, the update may include a repair, such as replacing a storage disk (such as a solid state drive, a hard disk drive, or the like), or any other hardware component of the hosting system 10. Additionally or alternatively, the update may include updating a software component, such as a driver, an operating system, an application, or the like in the hosting system 10. The update may also include installing a new hardware/software component into the hosting system 10.

Referring back to FIG. 3, the hypervisor 12 sends the public key 410 to the client device 20A in response to the request for a certificate from the client device 20A. The client device 20A authenticates validity of the public certificate 418 with the verification system 430, as shown at block 310. In response to the authentication being successful, the client device 20A further verifies the components of the hosting system 10, as shown at blocks 315 and 320. If the authentication fails, the client device 20A concludes that the client device 20A was not in communication with the hosting system 10, and abandons future communications, as shown at blocks 310 and 330.

In an example, verifying the components of the hosting system 10 includes requesting the hypervisor 12 for the features of the hosting system, as shown at block 322. The hypervisor 12, in response, sends the client device 20A a list of components of the hosting system 10. For example, the list may include hardware components of the hosting system 10, such as a processor, a memory, a co-processor, a graphics processor, a network card, or any other component of the hosting system 10. In addition or alternatively, the list includes software components of the hosting system 10, such as an operating system, a word processing application, a spreadsheet application, a driver, or any other software components of the hosting system 10. The list of components may include additional information of each component, such as a version number, identification, or any other information of the component. The client device 20A may verify the list of features from the hypervisor 12 via the verification system 430, as shown at block 325. In an example, the hypervisor 12 sends the list of features to the client device 20A via an encrypted communication to ensure that the information is not spoofed, as shown at block 324. The request from the client device 20A may also be encrypted with the public key ensuring that only the correct system with the corresponding key 415 can decrypt the feature request. In addition or alternatively, the feature request message contains a unique request number, for example a timestamp such as at a $\frac{1}{1000}$th of a second granularity or other generated number that is unique for each request. The hypervisor 12 decrypts the unique number and acknowledges back to the client device 20A as part of the reply. Thus, based on the unique number, the system ensures that neither the cloud provider nor any third party can perform a replay attack to simulate a previously cached non real-time reply in response to the feature request from the client device 20A. In addition, the hypervisor 12 digitally signs and encrypts the response, which contains the list of features. For example, the hypervisor encrypts the response using the client device's public key so that only the client device 20A can decrypt the message and allowing the client to independently verify the signature as genuine by validating with the system's public key and certificate. For example, the verification system 430 may compare the features of the hosting system 10 from the hypervisor 12 with the features stored by the manufacturing system 420, as shown at block 325. If the features do not match, the client device 20A may be notified accordingly, which may abandon future communications with the hosting system 10, as shown at block 330.

Else, if the features of the hosting system 10 are verified, the client device 20A establishes a secure communication channel with the hosting system 10, as shown at block 340. For example, the client device 20A extracts the public key 412 from the public certificate 410, as shown at block 342. In an example, the client device 20A generates and encrypts a session key using the public key 412, as shown at block 344. The client device 20A sends the encrypted session key to the hypervisor 12. The hypervisor 12 decrypts the session key using the private key 415, which is stored in the tamper proof hardware component 18, as shown at block 346. Since the hypervisor 12 of the hosting system 10 is the only one that can access the private key 415, the hypervisor 12 is the only one that can decrypt the encrypted message from the client device 20A and extract the session key. The session key may be a symmetric session key. Since the private key 415 corresponds to the public key 412, in case the public certificate 410 has been tampered with, the decryption of the session identifier fails. The hypervisor 12, in response to the encrypted session identifier from the client device 20A, sends an acknowledgement to the client device 20A, the acknowledgement being encrypted using the session key, as shown at block 348.

Upon receiving the acknowledgement, the client 20A requests the hypervisor 12 to initiate the virtual server 15A specifying hardware and software components to be associated with the virtual server 15A.

In an example, the client device 20A establishes the secure communication with the hypervisor 12, as shown at block 340, prior to validating the features of the hosting system 10, as shown at block 330. The client device 20A and the hypervisor 12, in such an example, use the secure communication channel to communicate the features of the hosting system 10, such as by encrypting communication across the secure channel using the session key.

Thus, based on the public certificate 410, which contains the public key 412, received from the hypervisor 12, the client device 20A authenticates that the hypervisor 12 is indeed hosted on the hosting system 10. The client device 20A authenticates the hypervisor by validating the digital signature of the public certificate 410 using the public key 412 with the verification system 430. If the digital signature is valid and the verification system 430 is trusted, then the client device 20A trusts that the public certificate 410 came from the manufacturer of the hypervisor 10, and proceeds to communicate with the hypervisor 12. If the digital signature does not verify, the certificate is invalid and processing ends.

Thus, the technical solutions described facilitate the client device to be assured that the client device is indeed in communication with a hypervisor on a trusted hosting system, based on the authenticity of the public certificate, which includes the public key of the hypervisor, using the verification system. If the message can be decrypted using the public key in the certificate 410, then the client device further determines that message has been encrypted using the private key, which only the authorized hypervisor has access to. As additional measure of security, the client device encrypts the symmetric key using the public key in the public certificate before sending it to the hypervisor. Since the hypervisor is the only one with access to the private key to decrypt the message and extract the session key, the client device can trust the encrypted message returned containing a list of functions and features provided by the hypervisor.

In addition, methods such as secure sockets layer (SSL) and transport layer security (TLS) may be used to further protect against compromised private keys and their associated certificates. In the case that a private key has been compromised, the certificate may be revoked by the verification system and placed on a list of revoked certificates.

Thus, in an example, the technical solutions described herein facilitate a computer manufacturer to build a physical server that facilitates a client to authenticate that a cloud provider does not have access to programs, data, configuration or other aspects of the virtual server that is hosted on the physical server, which may be owned by, and/or on physical premises of the cloud provider. For example, the client may desire to initiate a virtual server in a shrouded manner, that is the virtual server and its contents not being accessible by any other virtual server in the hosting system. Additionally, the client may prefer that the cloud provider also is able to access the virtual server or its contents. Thus, prior to initiating the virtual server, the client may desire to confirm that the hosting system on which the virtual server is being initiated is capable of such a shrouded virtual server. For example, for the hosting system to be capable of such a shrouded virtual server, the client may determine that the hosting system has to be equipped with predetermined hardware and software components, such as a particular brand and version of processors, memory, operating system, or any other components. The technical solutions described herein facilitate the client to confirm that the virtual server is deployed on the hosting system with the security characteristics desired. The technical solutions facilitate such a verification by a trusted authority, such as the computer manufacturer, or another third-party, and without a possibility of the confirmation being spoofed.

By using the technical solutions, the client device can be assured that the cloud provider has deployed a virtual server on a physical server that is used as hosting system, such that the cloud provider cannot access the client's data or programs in the virtual server.

The technical solutions further facilitate the client to authenticate (or certify) functions and/or features of the hosting system, such as the hardware components. Further yet, the client may confirm attributes of the hosting system (for example, physical hardware such as make, model, serial number, and so on). Thus, in an example, the client, with no prior relationship with the cloud provider, may securely communicate with a verification system, such as a third party system, or a manufacturer of a hosting system to request and obtain resources and features specific to computing hardware and/or software of the hosting system. Thus, the technical solutions provide a secure process to validate the underlying hardware and/or software configuration of the hosting system. Accordingly, the technical solutions facilitate the client to perform a remote attestation to request and authenticate that a specific server of the hosting system is commissioned for use in response to the server being of a machine type known to support shrouded virtual servers and that this feature is enabled and running on the server.

Extending Shrouding Capability of a Hosting System

For a client that stores data or deploys a virtual server on a hosting system provided by a cloud computing provider, protecting the physical servers that host the data and/or the virtual server from individuals and organizations with malicious intent is a critical consideration, especially if the data is sensitive data such as intellectual property. Typically, perpetrators include hackers, competitors, governments—local and foreign, and thieves. Despite the sophisticated security techniques and systems that have been developed over the years, computer systems remain vulnerable to new attack strategies, which have continued to be developed and deployed. Accordingly, the clients demand constant vigilance to prevent data compromise.

In addition, system and data compromise from outside the cloud provider's boundaries is not the only concern. Company employees, especially information-technology (IT) personnel, such as administrators or others may have broad access to the physical servers of the hosting system, and/or computer data and programs executing on the physical servers, in order to do their job. An employee of the cloud provider, that owns and/or manages the hosting system, may compromise the client's data, and thus sensitive information. As cloud environments become more widely used, this problem is further compounded, since a client utilizing a 3rd party cloud provider's system would demand levels of trust, and security from the cloud providers regarding propriety data and programs in the cloud provider's hosting system. Yet, the client may have no or minimal visibility as to who can access the data on the hosting system.

The technical solutions described herein facilitate increasing client trust in the hosting system commissioned by the cloud provider through design and technology that intrinsically impedes access to client data and programs by anyone, but the client, including the cloud provider's staff and administrators. Thus, the technical solutions provide protection for the client, especially concerned about security risks associated with utilizing a 3rd party hosting system, by preventing IT personnel, such as system administrators, database administrators, or any other employees of the cloud provider, from accessing, viewing, or copying the client's data or programs that utilize the hosting system. Further, the technical solutions extend shrouding capabilities of the hosting system facilitating the cloud provider to add new physical servers or machines to the hosting system. The new physical servers may be based on platforms such as x86 and POWER running Linux Guests with a KVM™ Hypervisor, which may be more open than a typical server in the hosting system. The more open platforms may be intrinsically less secure than an existing server in the hosting system, and may be added in response to request from the client for the particular hardware and/or software components of the more open platforms.

Typically, even in a hosting system that facilitates shrouded virtual servers to the client, the hosting system may use a hierarchical structure. The hierarchical structure may be a pyramid of employees arranged according to access rights. Typically, an employee above a predetermined level in the hierarchy, such as a "master administrator" at the top of the hierarchy pyramid has access to change security settings of the virtual server, and thus has virtually unfettered access to data within the virtual server, and at times, the entire hosting system.

In addition, if the client requests that the virtual server be deployed on an open platform based physical server, the security of the virtual server may be further depleted. The open platforms may not be manufactured to be part of a hosting system, and hence may be more susceptible to data hacking attacks than a physical server that is specifically manufactured for a hosting system environment. For example, the physical server for the hosting system may include tamper proof hardware and/or software components, such as crypto cards, encryption schemes, that may include information to authenticate the manufacturer and other components of the physical server (for example, as described above.) In another example, the cloud providers may elect to use less expensive commodity hardware (based on industry standard server technology) in hosting system in an effort to reduce cost. Such industry standard hardware and software components may facilitate the IT personnel of the cloud provider with broader access to data on the hosting system, compared to proprietary servers manufactured for hosting systems.

A cloud provider employee, such as someone with nefarious intentions, may monitor signals in smaller, industry standard server hardware, compared to monitoring internal signals for proprietary server technologies, such as proprietary servers like z System. For example, the proprietary servers may use dense Very Large Scale Integration (VLSI) silicon chips mounted on circuit boards in dense package configurations, thus making it extremely difficult, if not impossible, to monitor internal signals. Additionally, the proprietary servers, for providing adequate cooling may use heat sinks mounted on the silicon chips as well as strong and persistent air flow or water flow that would be disrupted by attempts to probe signals, resulting in damaged hardware. In addition, tamper resistant hardware that automatically disables itself when compromised is at times exploited to further improve physical security of such proprietary servers. Cloud providers are, typically, highly motivated to protect client data since a breach may have a negative business impact on the cloud provider. Further, disclosures that employees of the cloud provider accessing a client's data and programs, may negatively impact business. Accordingly, designing a hosting system so that a cloud provider employee is prohibited to circumvent the shrouding of client data and programs is an important feature for a cloud provider, and facilitated by the technical solutions described herein.

The technical solutions described herein facilitates an extension of the hosting system to heterogeneous environments in which the cloud provider may add physical servers that include proprietary tamper proof components in combination with physical servers which are more open, and do not include such proprietary components. Based on the technical solutions, the client can securely access, activate, communicate with and utilize a shrouded virtual server in the cloud provider's heterogeneous hosting system using a hardware manager console (HMC). Further, the client may request the cloud provider to add physical servers with specific components, which may not include the tamper proof components.

Figure 6:
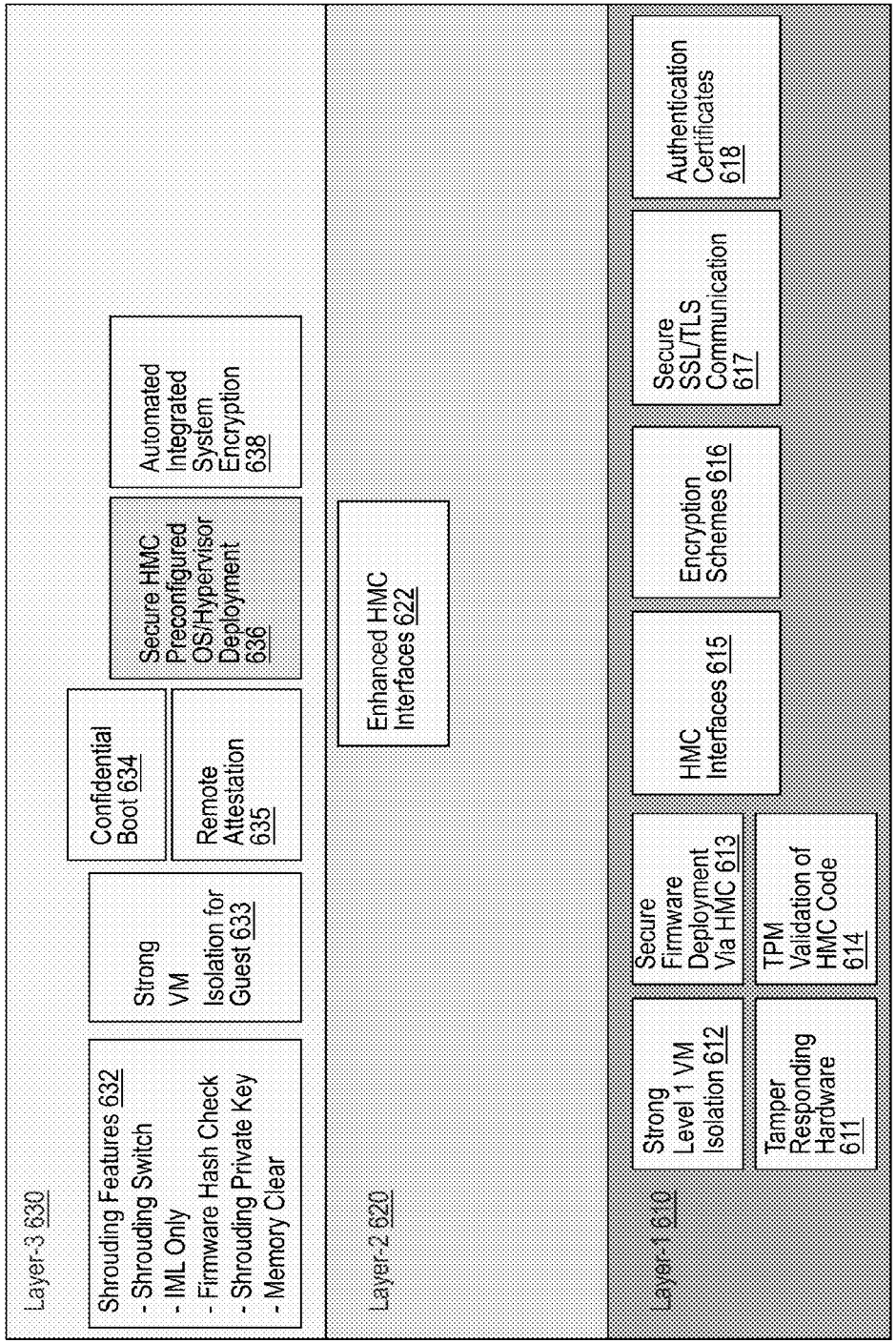
FIG. 6 illustrates features of a hosting system, in accordance with an embodiment.

FIG. 6 is a representation of the elements that constitute an end-to-end shrouded virtual machine system. These components are segmented into three layers. Layer-1 610 represents base technology, layer-2 620 represents interfaces to the base technology, and layer-3 630 represents security functionality to implement robust shrouding capability. The technical solutions describe a hosting system that implements the elements in a structure so that the client alone can access, activate, communicate with, and utilize shrouded virtual server in the hosting system. Of course, in other examples, features of the hosting system may be categorized differently than what is illustrated. The elements illustrated may be hardware elements, such as electronic circuits, field programmable gate arrays (FPGAs), application specific integrated circuits (ASICs), or a combination thereof.

Features that are categorized in layer-1 610 facilitate isolating (that is shrouding) one virtual server hosted in the hosting system from another. In an example, the features that are part of layer-3 630 may leverage the features of layer-1 610 to harden the hosting system. The features of layer-1 may include tamper respondent hardware 611 used to house and protect a private shrouding keys that can only be accessed in shrouding mode. The features of layer-1 610 may also include strong separation 612 of the virtual servers hosted on the hosting system, to prevent a client from utilizing a first virtual server on the hosting system as a gateway to hack into another client's virtual server on the hosting system. For example, IBM™ z System Level-1 LPAR provides such shrouding/isolation between virtual servers.

The layer-1 610 facilitates communication of the physical servers in the hosting system with the HMC of the hosting system via HMC interfaces 615. The HMC interfaces, in an example, may facilitate minimal programmatic access to client data. The layer-1 610 features further include encryption schemes 616, such as DM-Crypt for encrypting data of the virtual servers in the hosting system, including on guest physical servers. Thus, any data resident at the cloud provider facilities may be encrypted. The layer-1 610 features may further include Trusted Platform Modules (TPM) 614 for validation of firmware and code to detect tampering. Layer-1 610 features may further facilitate secure communication 617 such as for public/private key encryption, SSL/TLS and digital signatures/authentication or variations of such technologies. The layer-1 further includes functionality to provide and receive authentication certificates 618, such as those described above. The authentication certificates may be from the manufacturers of respective physical servers and/or from third party verification systems.

The technical solutions described modify the HMC interfaces 615, which may facilitate programmatic interfaces that provide a system administrator with access to client data. In addition, a secure firmware deployment 613, facilitates the HMC 710 to further secure the hosting system by deploying preconfigured hypervisor and/or boot-images as described further. As illustrated in layer-2 620, enhanced HMC interfaces 622 modify the HMC interfaces 615 to prevent access to client data. The enhanced HMC interfaces 622, in an example, facilitate the physical server to provide the system administrator no programmatic access to the client data.

Thus, the technical solutions facilitate the physical server to maintain the client's data and programs hidden from the cloud provider's employees and other users in a live application environment. The client has full access to the running virtual server to execute applications and process data. For example, the enhanced HMC interfaces 622 facilitate encryption of the client data and programs stored on hard drive or solid-state drives or any nonvolatile storage external to RAM associated with the shrouded virtual server to prevent access by cloud provider personnel. For example, the hard drives that contain any system dumps, logs, or trace files created by the client's applications or operating system of the virtual server, are encrypted thus facilitating the client to restrict access to problem determination data. Further, as described herein, the encryption function and keys are hidden from all including the cloud provider personnel. The client may have access to the encryption keys and functions, and in some examples may generate and/or select the keys and functions.

Layer-3 630 includes features to craft a fully shrouded system with integrated shrouding technology. For example, the layer-3 features includes shrouding features 132, which include features such as, facilitating access to a private key only if the physical server is in shrouded mode; adding of a switch that allows transitioning the physical server between legacy and shrouded mode; facilitating that the switching between shrouded and legacy mode can only be done via IML; adding the switch to the tamper proof hardware component; securely clearing real memory of the physical server during an IML to prevent access of private data after switching to legacy mode (or switching modes); comparing hash value of firmware including area containing switch and comparing it to a known hash value; and identifying tampering of data in the physical server by the tamper proof hardware component before determining a mode of the physical server.

The layer-3 630 features further include extending strong isolation to guest 633, a confidential boot 634, and remote attestation 635. The strong isolation to guest 633 facilitates the hosting system to add a guest server, which is another physical server such as using open platform, to the hosting system and shrouding (or isolating) a virtual server on the guest server from virtual server(s) on the existing physical server in the hosting system. The confidential boot 634 facilitates the client to securely deploy and initialize an environment in a shrouded virtual server the client has commissioned.

In addition, the layer-3 630 features include a Secure Pre-Configure Hypervisor and OS 136 for the guest server and an integrated encryption 638 for the guest server.

Figure 7:
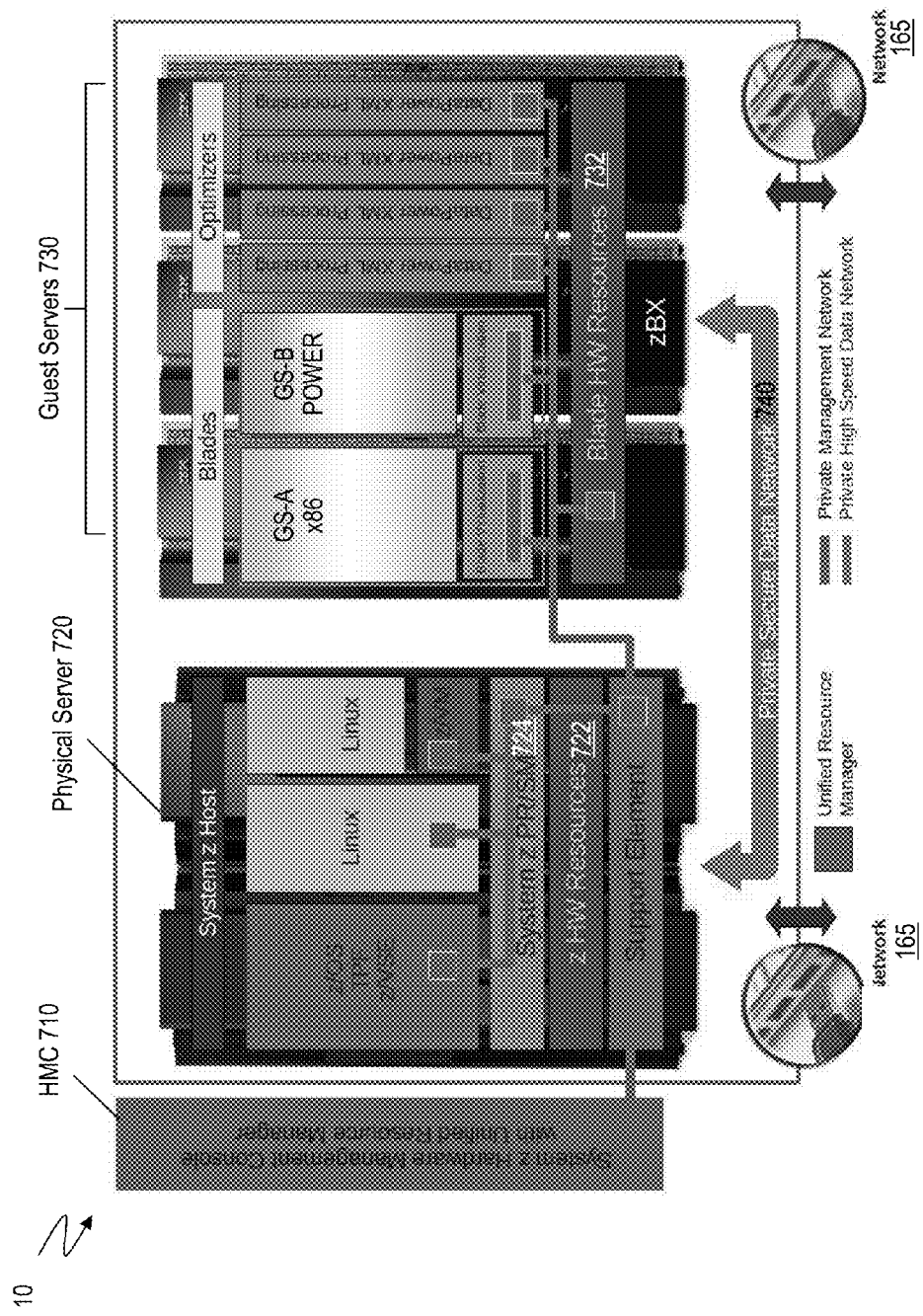
FIG. 7 illustrates components of a hosting system, in accordance with an embodiment.

FIG. 7 illustrates an example hosting system 10 with one or more guest servers added. The illustrated hosting system 10 includes a physical server 720, such as an IBM z System™ host. The physical server 720 maybe a physical server that includes proprietary tamper proof hardware component, providing high security features. The hosting system 10 further includes a HMC 710. The HMC 710 manages the addition and removal of physical servers to and from the hosting system 10. The HMC 710 may further be responsible to deploy hypervisor and or operating system images on the physical servers in the hosting system 10. The hosting system 10 further includes one or more guest servers 730. A guest server from the guest servers 730 may be a physical server that uses an open platform such as a guest server-A that uses x86 hardware and a guest server-B that uses POWER hardware. The guest servers 730 may further not include security provisions such as tamper proof hardware components or any other proprietary security components that are included in the physical server 720. For example, if the physical server 720 is a z System, the physical server 720 may include hardware resources 722, such as crypto cards, VLSI electronic circuitry, that is different than hardware resources 732 of the guest servers 730. Further, the guest servers 730 may operate a different, less secure operating system than that on the physical server 720. For example, the physical server 720 may include software components 724, such as PR/SM that facilitate secure virtual server isolation, which may not be supported by the guest servers that may execute operating system such as LINUX™, WINDOWS™, OS/X™ or any other operating system, typically used on commodity hardware. The HMC 710, the physical server 720, and the guest servers 730 may communicate with each other via private secure data network 740. In addition, the client, such as the client device 20A may communicate with the HMC 710, the physical server 720, and the guest servers 730 via the network 165.

Figure 8:
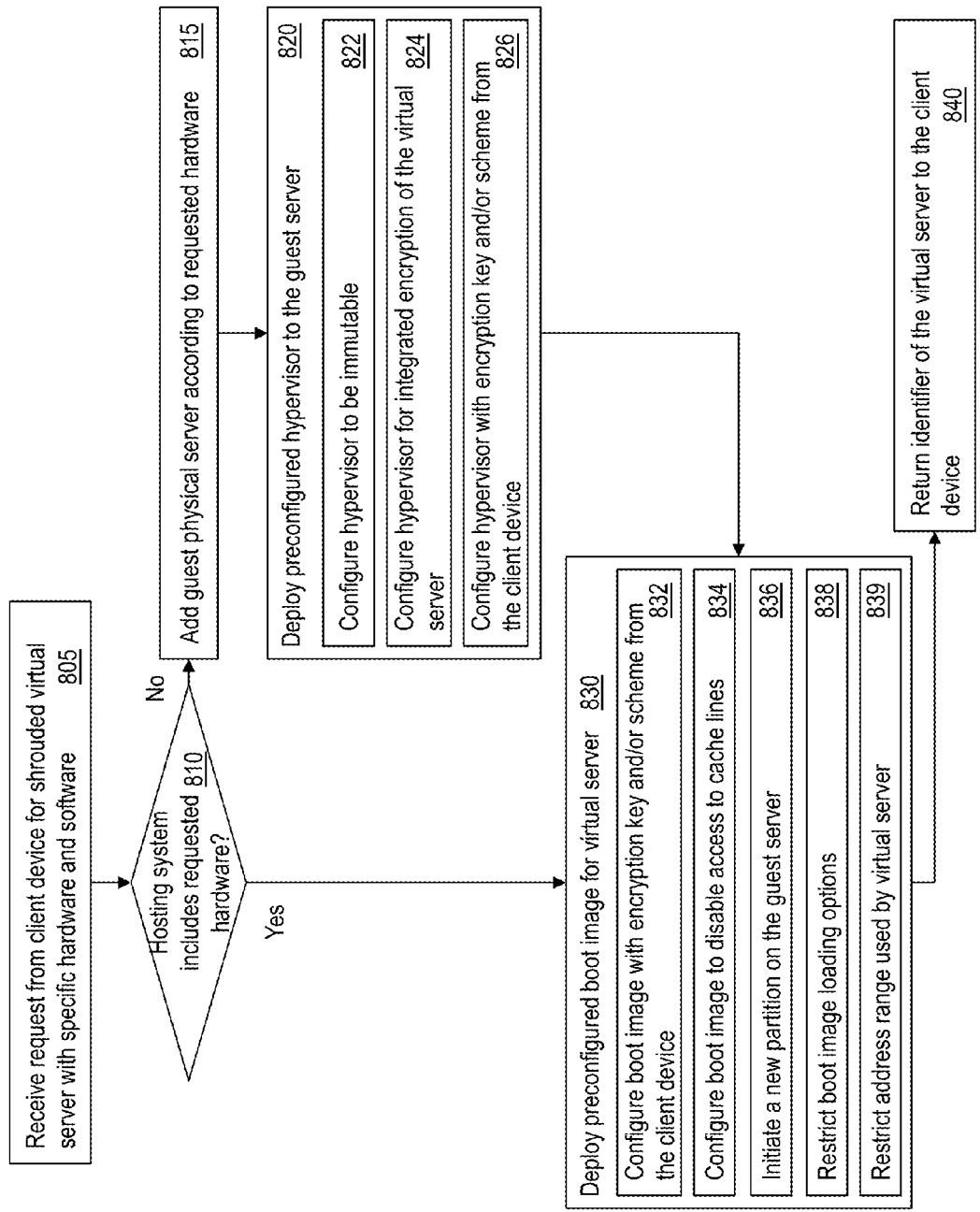
FIG. 8 illustrates a flowchart for extending shrouding capability of a hosting system, in accordance with an embodiment.

FIG. 8 illustrates a flowchart of example logic for extending shrouding capabilities of the hosting system to a guest server. The hosting system 10 receives a request from the client device 20A to deploy a virtual server 15A, as shown at block 805. The request may specify hardware and/or software components that the virtual server 15A is to have access to. For example, the client device 20A may request that the virtual server 15A is to be deployed on an x86 based machine with four processors, eight GB RAM, and other such hardware components. Additionally or alternatively, the request may specify that the virtual server 15A is to be deployed with LINUX™ version-Y as the operating system, where version-Y identifies a specific variation of the operating system. Of course, other examples may specify other hardware and/or software components than described herein. Additionally or alternatively, the client device 20A may specify that the virtual server 15A is to be deployed using the existing physical server 720 in the hosting system 10. The HMC 710 may determine if the hosting system 10 includes hardware and/or software configuration, such as the physical server 720, that satisfies the specifications of the request from the client device, as shown at block 810. If the existing physical server 720 does not match the specifications of the request, the HMC 710 adds a guest server to the hosting system 10, as shown at block 815. The guest server added includes that hardware components that the client device 20A requests.

The HMC 710 deploys a preconfigured hypervisor to the guest server, as shown at block 820. The pre-configuration inhibits programmatic access to the client data in the virtual server 15A via the hypervisor. For example, the HMC 710 may configure the hypervisor to be immutable so that a system administrator is unable to alter security settings of the hypervisor and/or the virtual server 15A, as shown at block 822. For example, the HMC 710 may configure the hypervisor for integrated data encryption, as shown at block 824. For example, the hypervisor encrypts all data that is stored within the virtual server 15A. For example, if an application running in the virtual server 15A saves a file, the data in the file being saved is first encrypted by the hypervisor. In an example, the hypervisor encrypts the data in the virtual server 15A by instructing the virtual server 15A to encrypt the data according to a predetermined encryption scheme. Further, as part of the integrated encryption, the hypervisor encrypts paging data of the virtual server 15A. For example, if the virtual server 15A uses virtual memory techniques to page data in and out of real memory, the hypervisor encrypts the data that the virtual server 15A pages out from the real memory, thus inhibiting access by the cloud provider personnel, such as a system administrator. In an example, the hypervisor encrypts the data using a session key received from the client device 20A. For example, the session key is received in response to the client device 20A authenticating the hosting system with the verification system 430. The HMC 710 stores the session key into the hypervisor during configuration of the hypervisor, as shown at block 826. In addition or alternatively, the HMC 710 may store an encryption scheme that the client device 20A selects into the hypervisor, which the hypervisor uses to encrypt the data, as shown at block 826. Thus, the HMC 710 configures the hypervisor and deploys such a preconfigured hypervisor to the guest server.

The HMC 710 further instructs the hypervisor to deploy the virtual server 15A using a preconfigured boot image, as shown at block 830. For example, the HMC 710 configures the boot image to encrypt the data within the virtual server 15A using a predetermined encryption key and/or encryption scheme, as shown at block 832. In an example, the encryption key and/or scheme may be those generated and/or selected by the client device 20A. Further, the HMC 710 configures the boot image to disable access to cache lines of the guest server, as shown at block 834. In addition or alternatively, the HMC 710 configures the boot image to restrict a "display and alter" feature of the guest server. For example, the guest server may facilitate a service personnel, such as a system administrator to access client data in the guest server by using a system dump that may include a system state such as after a system failure. The system administrator may further access the virtual server via a removable media or using a dump machine loader. The HMC 710 inhibits such data access by disabling the boot image of the virtual server 15A to be loaded other than through partition activation. Accordingly, the HMC 710 initiates a new partition (such as logical disk partition) on the guest server and launches the boot image in the new partition, as shown at block 836. During the loading of the boot image, the HMC 710 may restrict the hypervisor to load a clear SCSI dump that was generated without any system failures and which does not contain a state of the data in the virtual server 15A during a previous execution. For example, the HMC 710 does not allow or inhibits the hypervisor from loading a SCSI dump that contains system failure data. In addition or alternatively, the HMC 710 inhibits the hypervisor from selecting options, such as via an application programming interface (API) or a command line interface (CLI), such as SNMP, CIMOM, WS API, or any other interface. Thus, the HMC 710 restricts the loading options of the boot image, as shown at block 838.

By configuring the hypervisor and the boot image as described herein, the HMC 710 prevents a system administrator from programmatically accessing the client data in the virtual server 15A launched on the guest server, such as one of the guest servers 730. Thus, the HMC 710 extends the shrouding capability of the hosting system 10 to the guest server, since data logs and memory dumps for a partition on the guest server may be visible and accessible to the client who has commissioned the virtual server 15A, but not accessible by the system administrator. This restricted access facilitates viewing of client data is limited to within the client's shrouded virtual server image by the client themselves (for example, dumping into an encrypted dataset, the key known only to the client). Cloud provider personnel, such as the system administrator cannot access the log, or dump file unless the client selects to share such information with the cloud provider.

The hosting system 10 continues to provide hypervisor logs and dumps, such as a KVM dump, to the system administrator and system service personnel to trouble-shoot any system wide problems, without access to the data in the virtual server 15A. In other words, the HMC 710 facilitates the hosting system 10 to provide a memory dump but only including non-client data and programs. For example, the HMC 710 configures the boot image to use a predetermined address range for the virtual server 15A, as shown at block 839. The HMC 710 identifies to the hypervisor the address range permitted for the virtual server 15A, for example by storing a table that includes addresses used by the one or more virtual servers. The HMC 710, in an event of system failure in the virtual server 15A, such as that causes shutdown or restart of the virtual server, zeros all the data in the corresponding range at the time the memory dump is captured by the hypervisor. The HMC 710 may further compare a hash value of the address range to ensure that the address range is complete and has not been altered. If validation is not successful, a memory dump is not made available.

As further illustrated in FIG. 8, the hosting system 10 returns, to the client device 20A, an identifier of the virtual server 15A, such as an IP address, uniform resource locator (URL), or any other identifier that can be used to access the virtual server 15A, as shown at block 840.

Figure 9:
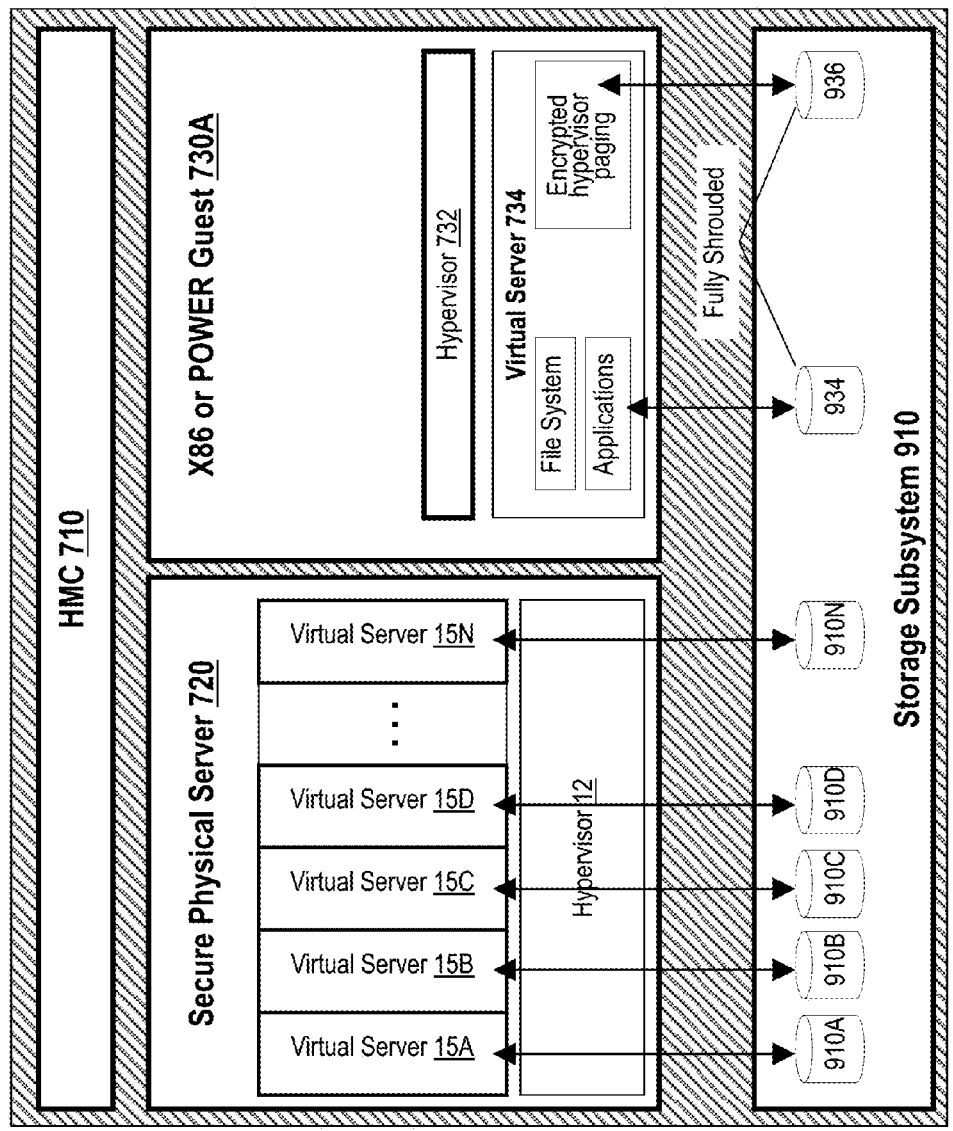
FIG. 9 illustrates a hosting system with extended shrouding capability, in accordance with an embodiment.

FIG. 9 illustrates a block diagram of the hosting system 10 with the guest servers 730 added according to the technical solutions described herein. The hosting system 10 illustrates the hosting system 10 that includes a secure physical server 720, that uses a secure firmware and hardware, such as the z System Firmware and Hardware to deploy virtual servers 15A-15N in shrouded mode. That is, as illustrated, each virtual server from the virtual servers 15A-15N is isolated from each other by the hypervisor 12 and data within the virtual servers 15A-15N is stored in respective storage disk or partition 910A-910N in a storage subsystem 910 of the hosting system 10. As described herein, the HMC 710 extends the capability of the hosting system 10 to deploy shrouded virtual servers on more open, industry standard servers, such as the guest server 730A. The shrouding capability of the hosting system 10 is extended by deploying preconfigured hypervisors and/or boot images for the guest servers, which may be x86 or POWER based systems. By extending the shrouding capability, the guest server 730A intrinsically impedes access to client data and programs by anyone except the client, including the cloud provider's staff and administrators. For example, consider that the client requested a Linux KVM (Kernel-based Virtual Machine) virtual server with specific hardware and/or software configuration. The HMC 710 facilitates extending the hosting system 10 with the guest server 730A which includes the requested specifications. The HMC 710 further configures a hypervisor 732, such as by rendering the hypervisor immutable and the like, before deployment of the hypervisor 732 from the HMC 710. The HMC 710 makes additional or alternative firmware modifications and designed enhancements to the guest server 730 to harden the hypervisor 732 to impede programmatic access to client data and programs of a virtual server 734 on the guest server 730. For example, the HMC 710 configures the hypervisor 732 so that intrinsic system features cannot be changed, disabled or circumvented by the system administrator. Alternatively or in addition, the HMC 710 incorporates a firmware structure with an API for the hypervisor 732 that the hypervisor 732 can use. The HMC 710 further deploys the virtual server 734 using a preconfigured boot image that further restricts the capability of the guest server 730A. In an example, the boot image of the virtual server 734 is configured based on the capabilities of the guest server 730A. For example, the HMC 710 configures the virtual server 734 to store data, such as data related to applications or file-system within the virtual server 734 to a separate storage disk or partition 934 in the storage subsystem 910. The HMC 710 may additionally configure the virtual server 734 and/or the hypervisor 732 to encrypt the data in the storage disk or partition 934, such as using an encryption key from the client. Additionally, the HMC 710 configures the virtual server 734 to encrypt paging data to a separate storage disk or partition 936. The paging data may be encrypted using the encryption key form the client. In an example, the encryption key for the data within the virtual server 734 may be different than the encryption key used for encrypting the paging data. In another example, the storage disk or partition 934 and 936 may be one and the same.

In another example, initialization, the HMC 710 validates the hypervisor and boot-image being deployed, such as by comparing a hash value of the hypervisor and/or the boot-image with predetermined hash value. Of course, other validation techniques may be used in other examples.

Thus, the technical solutions described herein mitigate shrouding weakness and limitations associated with industry standard systems, such as open platforms and/or commodity hardware by extending capabilities of a hosting system, such as z System. In addition to providing the shrouding capability, the technical solutions described herein provide techniques to pre-configure and deploy a secure hypervisor and an operating system image to dissimilar systems coupled to a hosting system, such as Power System (IBM POWER Servers) and System x (x86 Servers) being coupled to z System servers via zBX features. For example, a secure enhanced Linux operating system image may be preconfigured for deployment, as described herein.

Thus, the technical solutions described herein secure cloud services that inhibit third parties, including the cloud provider themselves, from having access to client data and programs. The technical solutions secure system initialization and deployment for heterogeneous server architectures that prevent code, including firmware and hypervisor code from being compromised or altered. The client may communicate with the hosting system via a secure communication path. The technical solutions also facilitate the client to remotely validate the hosting system, and the features supported by the hosting system, such as shrouded virtual servers. The hosting system further facilitates storage separation between distinct virtual servers, and further provides system hardware and firmware that contain no programmatic access for anyone other than the client to access the client's virtual server, programs and data. The hosting system further facilitates the shrouded virtual server to encrypt client data and programs from being accessed outside the virtual server.

End-to-End Protection for Shrouded Virtual Servers

Technical solutions described herein include an end-to-end system and method by which the client can securely access, activate, communicate with and utilize the shrouded virtual server in the hosting system 10. The techniques described further improves isolation features of the hosting system 10 to further secure the hosting system 10 by making the hosting system 10 an immutable system with system wide shrouding attributes. For example, the improvements further strengthen separation of the virtual servers 15A-15N running on the hosting system 10, thus preventing data of a first virtual server being accessed via another virtual server on the hosting system, using the other virtual server as a gateway to hack into the first virtual server. The technical solutions facilitate such improved isolation between the virtual servers 15A-15N regardless of whether the hypervisor 12 supports shrouding.

Another aspect provided by the technical solutions is to secure deployment of firmware, hypervisors, and operating systems in a shrouded manner to inhibit external access, even by system administrators of the cloud provider. Thus, the technical solutions prevent tampering of the virtual servers 15A-15N by parties with nefarious intent.

Figure 10:
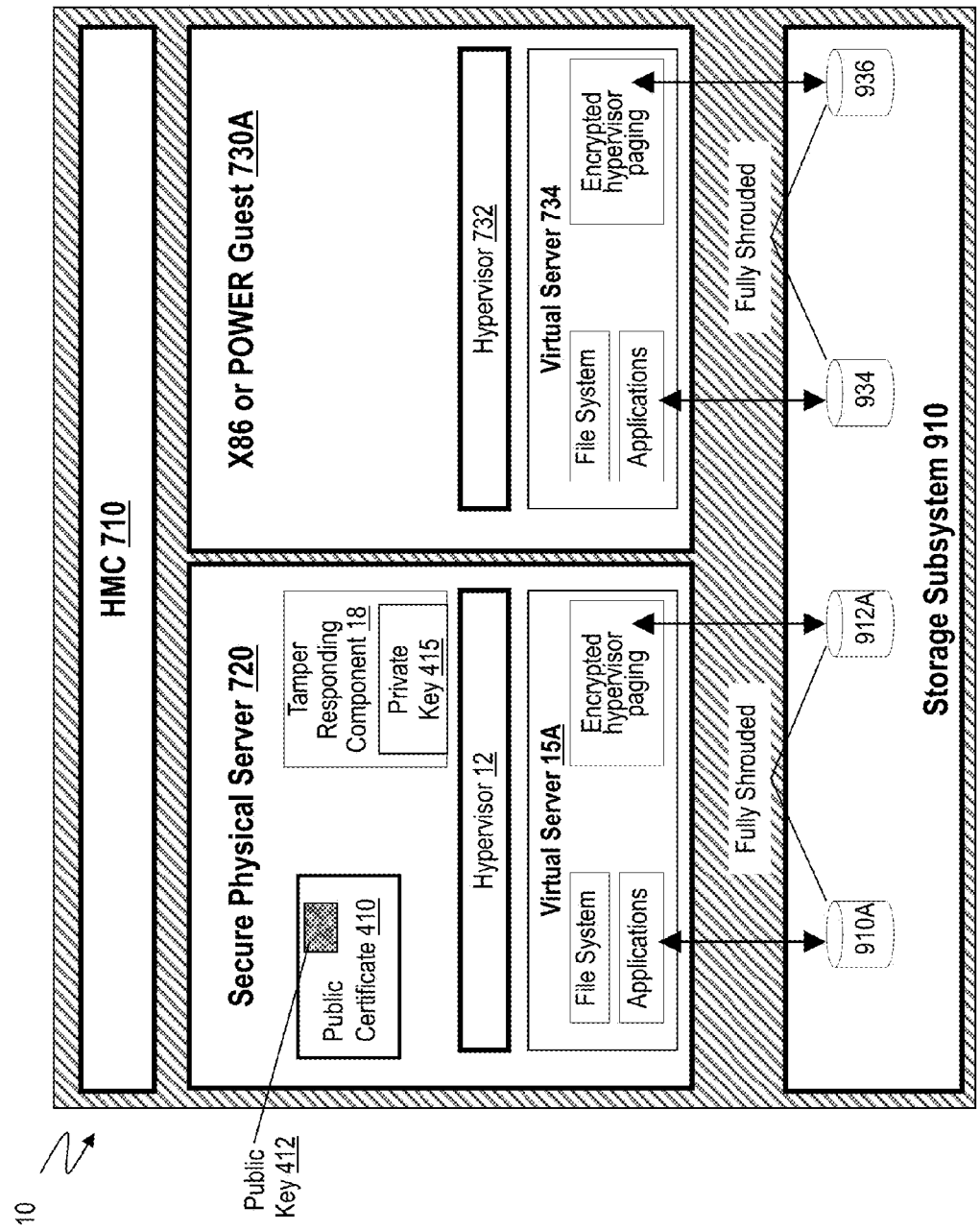
FIG. 10 illustrates a hosting system that provides an end-to-end secure virtual server, in accordance with an embodiment.

FIG. 10 illustrates the hosting system 10 that provides an end-to-end secure hosting system. For example, the hosting system 10 implementing technical solutions described herein, such as IBM z System, and Power System servers, may include the Hardware Management Console (HMC) 710. The HMC 710 facilitates addition and use of a guest server 730A as described herein.

The HMC 710 in addition facilitates improving the security of the secure physical server 720. The secure physical server 720 includes the public certificate 410 that in turn, includes the public key 412 that a manufacturer of the physical server 720 generates. In addition, the physical server 720 includes the tamper proof component 18 that stores the private key 415 from the manufacturer. The HMC 710 shrouds the virtual server 15A that has been deployed on the physical server 720 similar to the shrouded virtual server 734 that is deployed on the guest server 730A. For example, as described earlier, the HMC 710 preconfigures the hypervisor 12 prior to deployment and further preconfigures a boot-image of the virtual server 15A. The hypervisor 12 and the boot-image of the virtual server 15A may be configured similar to those of the hypervisor 732 and the boot-image of the virtual server 734, respectively.

In addition, the HMC 710 further secures the physical server 720 by impeding a cloud provider's personnel and administrator from programmatically accessing, viewing or copying data and programs from within the shrouded virtual server 15A. To this end, the HMC 710 detects and disables or removes, authorities, interfaces and other components that facilitate accessing, viewing, or copying data or programs from the hosting system 10 (hardware, firmware, hypervisor, and so on). For example, the physical server 720, such as z System, allows administrators to access individual cache lines to display and alter data from anywhere in the server. The physical server 720 may further facilitate an administrator to load and access removable media. In another example, the physical server 720 may facilitate an administrator to boot the physical server 720 from a separate disk partition. The technical solutions described herein facilitate the HMC 710 to disable such unauthorized access, such as by ensuring that the partition data is always cleared before a load other than through partition activation.

In an example, the HMC 710 further secures the physical server 720 by deploying the virtual server 15A using a secure repository of preconfigured hypervisors, firmware, and/or boot-images that inherently restrict access to the virtual server 15A. The HMC 710, thus, hampers an attacker's ability to alter the physical server 720 by inhibiting programmatic access to view, copy, or alter firmware, hypervisors, and/or boot-images.

For example, the preconfigured hypervisor 12 and the boot-image of the virtual server 15A encrypts the data of the applications within the virtual server 15A as well as the paging data into respective storage dusk or partition of the storage subsystem 910. Accordingly, irrespective of whether the client device 20A requests a virtual server 15A on the physical server 720 or the virtual server 734 on the guest server 730A, the HMC 710 secures the corresponding host machine.

Figure 11:
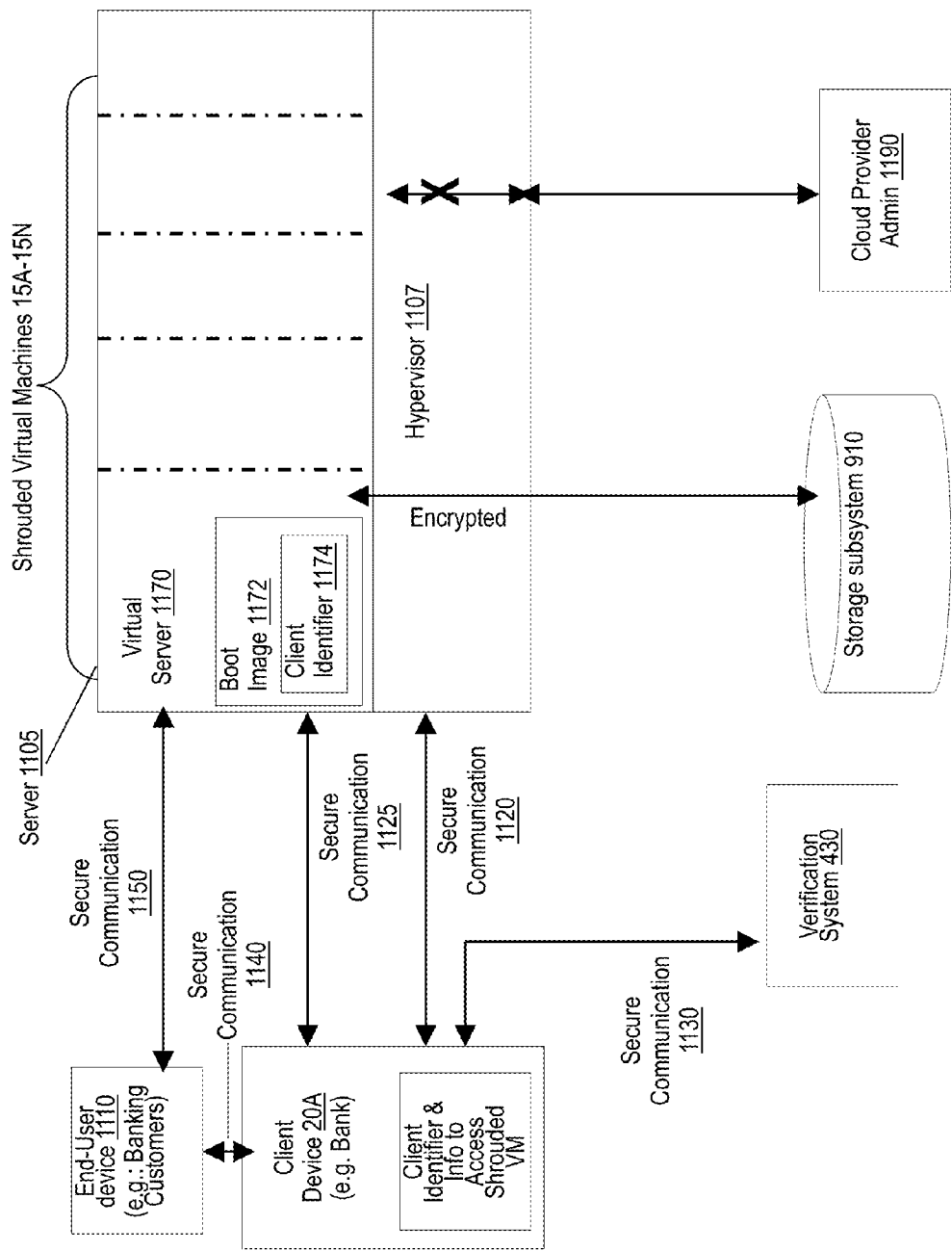
FIG. 11 illustrates a hosting system with end-to-end security, in accordance with an embodiment.

FIG. 11 illustrates the hosting system 10 implementing an end-to-end secure virtual server. The server 1105 illustrated maybe the physical server 720 or the guest server 730A or a combination thereof, with corresponding hypervisor 1107 and shrouded virtual servers 15A-15N. The hosting system 1105 deploys a virtual server 1170 in response to a request from the client device 20A. In an example scenario, consider that the client device 20A is of a financial institution, such as a bank. Of course, the client device 20A may belong to other type of client in other examples. Further, consider that an end-user device 1110 uses the virtual server 1170, where the end-user is a client of the client, which in the above example is the bank's customer.

Figure 12:
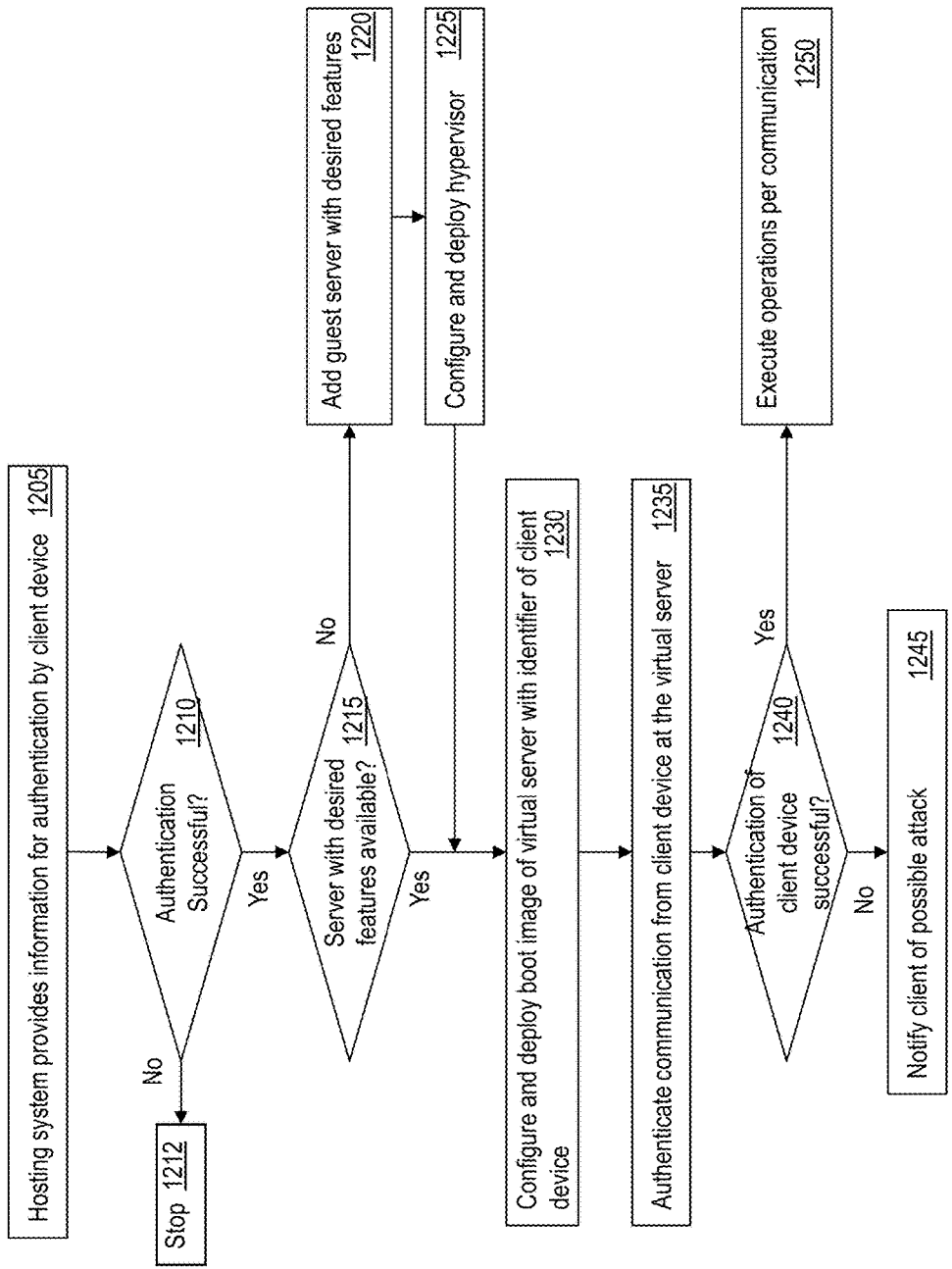
FIG. 12 illustrates a flowchart of example logic to implement a hosting system with end-to-end security, in accordance with an embodiment.

FIG. 12 illustrates a flow chart of the hosting system 10 providing an end-to-end security for the client device 20A when requesting deployment of and operating the shrouded virtual server 1170. The client device 20A contacts the hosting system 10, using a secure communication 1120, such as via SSL/TLS utilizing a public key of the server 1105. The client device 20A may request for, and in response, the hosting system 10 provides the client device 20A information to authenticate the hosting system 10, as shown at block 1205. In an example, the hosting system 10 provides the public certificate 410 of the server 1105 to the client device 20A, where the public certificate 410 includes the public key 412 of the hosting system 10. The client device 20A verifies the identity and trustworthiness of the hosting system 10, such as by verifying a digital signature of the public certificate 410 via a verification system 430. The client device 20A may authenticate the hosting system 10 with the verification system 430 via a secure communication 1130. If the authentication is not successful, the client device 20A may abandon the request for the virtual server 1170 from the hosting system 10, as shown at blocks 1210 and 1212.

Else, if the authentication is successful, the client device 20A requests features of the one or more physical servers of the hosting system 10. In an example, the client device 20A may request the hosting system 10 to provide specific hardware and/or software components that the client device 20A may desire to deploy the virtual server 1170. In response, the hosting system 10 may identify the physical server 720 to the client device 20A to deploy the virtual server 1170. The client device 20A verifies whether the physical server 720 has the specified features, as shown at block 1215. For example, the client device 20A may verify the features of the physical server 720 using the verification system 430. If the physical server 720 meets the specifications requested by the client device 20A, the HMC 710 uses the physical server 720 as the server 1105 illustrated in FIG. 11 by proceeding to deploy a pre-configured boot-image 1172 corresponding to the virtual server 1170, as shown at block 1230. Else, if the physical server 720 fails to meet the specifications, the HMC 710 adds the guest server 730A and deploys a preconfigured hypervisor on the guest server, which is then used as the server 1105 to deploy the virtual server 1170, as shown at blocks 1220 and 1225. The HMC 710 further deploys the preconfigured boot-image 1172, as shown at block 1230. The HMC 710 provides an identifier, such as an IP address or a URL of the virtual server 1170 to the client device 20A.

The client device 20A generates a session key, such as a symmetric session encryption key via SSL/TLS for secure communication with the virtual server 1170 via a secure communication 1125. The HMC 710 provides the virtual server 1170 a client identifier 1174. The client identifier 1174 may include the session key and/or any other identification of the client device 20A. In an example, the HMC 710 configures the boot-image with the client identifier 1174 prior to deployment, as described earlier. Alternatively or in addition, the HMC 710 stores the client identifier 1174 in the virtual server 1170 after the boot image 1172 has been deployed. For example, in case the virtual server 1170 is deployed on the physical server 720, the HMC 710 may use a preconfigured boot-image that is stored in a repository. Since the hardware and/or software components of the physical server 720 are previously known, the HMC 710 maintains a repository of preconfigured boot-images that impede administrator access of virtual servers deployed on the physical server 720. In such cases, the HMC 710 stores the client identifier 1174 after the virtual server 1170 has been deployed.

The virtual server 1170 uses the client identifier 1174 to authenticate communication it receives, to verify that a securely communication 1125 with the client device 20A ensues, as shown at block 1235. For example, the client device 20A encrypts communication messages for the virtual server 1170 using the session key that may be part of the client identifier 1174. Further, in response, the virtual server 1170 encrypts the communication messages for the client device 20A using the session key.

The session key may be the symmetric key that was provided during the initial SSL/TLS session or an additional new symmetric session key may be generated via a new SSL/TLS session to ensure the cloud provider administrator has no knowledge of the session key used for encrypting the communication messages. In an example, the virtual server 1170 is enabled after a first communication from the client device 20A is validated according to the client identifier 1174. If the authentication of the communication from the client device 20A fails, the virtual server 1170 communicates to the client device 20A or any other contact information of the client that a possible attack has been detected, as shown at blocks 1240 and 1245. Else, the virtual server 1170 proceeds to respond to the communication from the client device 20A by performing operations as requested by the communication, as shown at block 1250.

Thus, the hosting system 10 provides the client device 20A that commissioned the shrouded virtual server 1170 from the cloud provider, a secure communication 1125 by which to communicate with the shrouded virtual server in a way that communication is hidden from a cloud provider administrator 1190. Further, the client device 20A may provide the identifier of the virtual server 1170 to the end-user device 1110 via a secure communication 1140. The client device 20A may further provide the end-user device the symmetric key to use for communication with the virtual server 1170. Accordingly, the end-user device 1110 may initiate communication with the virtual server 1170 via a secure communication 1150. In another example, the client device 20A generates a separate session key for each end-user device 1110 and sends the separate session keys to the virtual server 1170 for identifying the respective end-user devices.

Thus, the technical solutions described herein provide an end-to-end secure system to deploy and use a virtual server from an authenticated hosting system. The HMC configures the virtual server on a physical server and deploys a hypervisor and/or a boot image in conjunction with validation based on predetermined hash values to ensure that the deployed hypervisor and/or boot image has not been compromised. The technical solutions further include remote attestation, for a client device to securely contact and communicate the hosting system to commission (that is, request) cloud resources such as to deploy the virtual server with specific security feature and characteristics (for example, supporting shrouded virtual server).

The hosting system further facilitates the client device to execute a confidential boot of the virtual server. For example, a client device may request a KVM guest to download a Linux operating system, applications programs, and data in a secure shrouded manner so all programs and data remain hidden from a system administrator. For example, the virtual server is provisioned with a confidential boot kernel and data/secrets to confirm the credentials of the client. This may be done automatically by the HMC without involvement of the system administrator so that the administrator does not have access to passwords or other secrets provided to/by the client. Additionally, the HMC modifies the physical machine on which the hypervisor and the virtual server are deployed on so that there is no programmatic access to security settings and/or data on the physical machine, by anyone including the system administrator.

Thus, the shrouded virtual server is deployed on a physical machine hardened so that the system administrator cannot access, view, or copy data or programs that reside within the shrouded virtual server. All specialized authorities, interfaces, and other techniques that would allow accessing, viewing or copying data or programs are disabled, password restricted, or removed from the physical machine (hardware, firmware, hypervisor, hardware management console, and so on). In addition, strong separation between the virtual servers running on the hosting system is provided to prevent one virtual server being used as a gateway to hack into another virtual server.

Further, the hosting system hides the client's data and programs from the system administrator and other users in a live application environment, maintaining full access by the client device that commissioned the virtual server. For example, all client data and programs stored on the storage subsystem in the hosting system, which may include hard disk drives, solid state drives, or any other such nonvolatile storage, is encrypted to prevent access by cloud administrator. The HMC 710 may further configure the virtual server to encrypt the storage drives that contain system dumps, logs, or trace files created by the applications or operating system of the virtual server, thus facilitating the client device to restrict who has access to problem determination data.

In addition, or alternatively, the hosting system provides that client data and programs stored outside the client's KVM guest partition on the storage subsystem of the hosting system is encrypted. The encryption may be performed using the operating system of the virtual server, or the hypervisor, such as a Linux encryption function, such as Dm-crypt. In another example, the client device supplies the encryption key to be used for encrypting the data on the storage subsystem to further secure the data from the system administrator. In yet another example, the client device provides both, the encryption scheme and keys for encrypting the data.

In yet another example, the HMC uses integrated encryption contained in the physical machine's firmware and hardware in an automatic manner to enhance security of the data. Thus, the client device would not have to enable the encryption in their environment for shrouding to be effective. Further, this would eliminate communicating the encryption keys back and forth between the client device and the hosting system, and thus be hidden from the system administrator.

The client device may initiate communication with the shrouded virtual server utilizing a secure communication such as SSL/TLS. For example, the client device may use symmetric session keys and establish an SSL/TLS session to communicate with the virtual server. The client device may use the symmetric key that was created during the initial session between the client device and the hosting system when commissioning the virtual server, and which may be provided to the boot image of the virtual server for later use. In another example, a second SSL/TLS session may be initiated between the client device and the virtual server to create a new key.

In another example, a tamper resistant hardware in the physical server is used to hold a private key which is used to enable secure communication between the client device and the physical machine. The symmetric session key used to encrypt/decrypt data between the client device and the shrouded virtual server is generated by the SSL/TLS session using this private key accessed directly by the hypervisor and stored in the tamper resistant hardware, so that only the shrouded virtual server and not the system administrator has access to this private key.

The HMC further secures the physical machine that deploys the virtual server by preconfiguring the hypervisor and/or boot image of the virtual server to disable programmatic access to hardware/software components of the physical machine. For example, the functionalities disabled may include capabilities such as: "display and alter" that provide system administrators or service personnel from having access to client data via memory bus and/or cache lines. Other such capabilities that are neutered include disabling access to removable media, disabling access to dump machine loader data, and disabling booting other than through partition activation. By restricting booting only through partition activation, the HMC ensures that ensure that partition data is cleared before a load. The HMC may further only allow a load clear or SCSI load but restrict load normal or SCSI dump. For example, the HMC restricts activation profile options (UI and APIs) to prevent any loads without a clear before the load.

The HMC further configures the hypervisor and/or virtual server to have integrated encryption for any paging functions in and out of memory space initiated by the hypervisor. An encryption key known only to the firmware and not accessible nor visible to anyone including the system administrator may be used, such as the session key from the client device.

Logging and memory dumps for any guest partition will visible and accessible to the client device that has commissioned the virtual server but is not accessible by the system administrator. This restricted access ensures viewing of client data is limited within the shrouded virtual server image by the client (for example, dumping into an encrypted data-set, the key known only to the client). Thus, system administrator does not have access to the logs unless the client chooses to share information with the system administrator. In an example, the HMC may provide KVM hypervisor logs and dumps that are accessible by the system administrator and system service personnel to trouble shoot system wide problems. For example, the HMC facilitates a memory dump capability but only non-client data and programs are visible. In another example, the HMC configures the hypervisor to maintain tables that include address ranges used by virtual servers and zeroes data in those ranges in case of system failure. The address ranges may be predetermined and the hypervisor may checked the address ranges such as using a hashing function to ensure they are complete and have not been altered. If validation is not successful, no memory dump is made available.

Thus, the technical solutions describe an end-to-end system for providing secure cloud services that inhibits third parties, including the cloud provider themselves, from having access to client data and programs. The technical solutions prevent code, including firmware and hypervisor code, from being compromised or altered and establish a secure communication path between client and cloud provider system. The client may remotely validate that the system supports shrouded virtual server with storage separation between distinct virtual servers. The client may further validate that the system hardware and firmware has been configured to impede programmatic access by anyone other than the client to the virtual server, programs and data. The system subsequently deploys a shrouded virtual server utilizing encryption to prevent client data and programs from being accessed outside the virtual server. The system further notes identification from the client device to authenticate communications from the client device or an end-user device that has been authorized by the client device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A system for extending shrouding capability of a virtual server hosting system, the system comprising:
    a server computer; and
    a host manager console configured to:
        receive a request to deploy a shrouded virtual server using a predetermined set of hardware components, and using a shrouded mode, the shrouded mode preventing an administrator of a hosting system from accessing data or applications of the virtual server, the request being sent by a client device;
        add a guest server to the hosting system, the guest server comprising the predetermined set of hardware components;
        deploy a preconfigured hypervisor on the guest server, wherein the preconfigured hypervisor is deployed in an immutable mode that disables changes to security settings of the preconfigured hypervisor;
        deploy, via the preconfigured hypervisor, a preconfigured boot image as an instance of the virtual server on the preconfigured hypervisor by initiating a new disk partition on the guest server and deploying the preconfigured boot image on the new disk partition and restricting the preconfigured hypervisor to loading a clear memory dump that was generated without a system failure; and
        send an identifier of the virtual server for receipt by the client device.

2. The system of claim 1, wherein the host manager console is further configured to determine that a server in the hosting system has different hardware components from the predetermined set of hardware components, and add the guest server in response.

3. The system of claim 1, wherein the host manager console configures the virtual server to encrypt the data in the virtual server using a session key received from the client device.

4. The system of claim 1, wherein the host manager console configures the virtual server to encrypt paging data using a session key received from the client device.

5. The system of claim 1, wherein the host manager console configures the virtual server to disable access to cache lines of the guest server.

6. The system of claim 1, wherein the host manager console is further configured to, prior to deployment of the preconfigured hypervisor on the guest server, determine authenticity of the preconfigured hypervisor by comparing a hash value of the preconfigured hypervisor with a predetermined value.

7. The system of claim 1, wherein the new disk partition is a logical disk partition.

8. The system of claim 1, wherein the clear memory dump further does not contain a state of from a previous execution of the shrouded virtual server.

9. A computer program product for extending shrouding capability of a virtual server hosting system, the computer program product comprising a computer readable storage device, the computer readable storage device comprising computer executable instructions, wherein the computer readable storage device comprises instructions to:
    receive a request to deploy a shrouded virtual server using a predetermined set of hardware components, and using a shrouded mode, the shrouded mode preventing an administrator of a hosting system from accessing data or applications of the virtual server, the request being sent by a client device;
    add a guest server to the hosting system, the guest server comprising the predetermined set of hardware components;
    deploy a preconfigured hypervisor on the guest server, wherein the preconfigured hypervisor is deployed in an immutable mode that disables changes to security settings of the preconfigured hypervisor;
    deploy, via the preconfigured hypervisor, a preconfigured boot image as an instance of the virtual server on the preconfigured hypervisor by initiating a new disk partition on the guest server and deploying the preconfigured boot image on the new disk partition and restricting the preconfigured hypervisor to loading a clear memory dump that was generated without a system failure; and
    send an identifier of the virtual server for receipt by the client device.

10. The computer program product of claim 9, wherein the computer readable storage device further comprises instructions to determine that a server in the hosting system has different hardware components from the predetermined set of hardware components, and add the guest server in response.

11. The computer program product of claim 9, wherein the computer readable storage device further comprises instructions to configure the virtual server to encrypt the data in the virtual server using a session key received from the client device.

12. The computer program product of claim 9, wherein the computer readable storage device further comprises instructions to configure the virtual server to encrypt paging data using a session key received from the client device.

13. The computer program product of claim 9, wherein the computer readable storage device further comprises instructions to, prior to deployment of the preconfigured hypervisor on the guest server, determine authenticity of the preconfigured hypervisor by comparing a hash value of the preconfigured hypervisor with a predetermined value.

14. The computer program product of claim 9, wherein the new disk partition is a logical disk partition.

15. The computer program product of claim 9, wherein the clear memory dump further does not contain a state of from a previous execution of the shrouded virtual server.

* * * * *